(12) United States Patent
    Tashiro

(10) Patent No.: US 12,505,005 B2
(45) Date of Patent: Dec. 23, 2025

(54) ULTRASOUND SYSTEM AND CONTROL METHOD OF ULTRASOUND SYSTEM

(71) Applicant: FUJIFILM Corporation, Tokyo (JP)

(72) Inventor: Rika Tashiro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 124 days.

(21) Appl. No.: 18/152,673

(22) Filed: Jan. 10, 2023

(65) Prior Publication Data

US 2023/0161657 A1   May 25, 2023

Related U.S. Application Data

(63) Continuation of application No. PCT/JP2021/008887, filed on Mar. 8, 2021.

(30) Foreign Application Priority Data

Jul. 16, 2020 (JP) .................. 2020-121906

(51) Int. Cl.
    *G06F 11/07* (2006.01)
    *A61B 8/00* (2006.01)

(52) U.S. Cl.
    CPC .......... *G06F 11/076* (2013.01); *A61B 8/4472* (2013.01); *A61B 8/461* (2013.01);
    (Continued)

(58) Field of Classification Search
    CPC ............... G06F 11/076; G06F 11/0736; G06F 11/0793; G06F 11/327; G06F 11/0769;
    (Continued)

(56) References Cited

U.S. PATENT DOCUMENTS

2010/0249600 A1* 9/2010 Kudoh .................. A61B 8/565
                                                600/459
2011/0105904 A1* 5/2011 Watanabe ............... A61B 8/56
                                                600/443
(Continued)

FOREIGN PATENT DOCUMENTS

JP      2001-084074 A    3/2001
JP      2008-282086 A   11/2008
(Continued)

OTHER PUBLICATIONS

Reliable wireless control: Wireless connection in the control loop by Olaya et al; IEEE Xplore (Year: 2016).*
(Continued)

*Primary Examiner* — Michael Maskulinski
*Assistant Examiner* — Kayo Lisa Rusin
(74) *Attorney, Agent, or Firm* — Studebaker Brackett PLLC

(57) ABSTRACT

In an ultrasound system and a control method of the ultrasound system, in a case where the number of times of an operation corresponding to first operation information as at least one piece of operation information among a plurality of pieces of operation information corresponding to a wireless connection error, which is performed by a user, has reached a predetermined number within a predetermined period, second operation information as at least one piece of the operation information among the plurality of pieces of operation information, which corresponds to an operation that is not performed by the user, is proposed to the user.

20 Claims, 12 Drawing Sheets

(52) U.S. Cl.
CPC ............ *A61B 8/58* (2013.01); *G06F 11/0736* (2013.01); *G06F 11/0793* (2013.01)

(58) Field of Classification Search
CPC ......... A61B 8/4472; A61B 8/461; A61B 8/58; A61B 8/56; A61B 8/465; A61B 8/4427
See application file for complete search history.

(56) References Cited

U.S. PATENT DOCUMENTS

| | | | |
|---|---|---|---|
| 2013/0226001 A1 | 8/2013 | Steen et al. | |
| 2016/0080600 A1* | 3/2016 | Nishida | H04N 1/00063 358/1.14 |
| 2016/0278739 A1* | 9/2016 | Pelissier | G01S 7/52082 |
| 2017/0017538 A1* | 1/2017 | Rudorfer | G06F 11/0751 |
| 2017/0060601 A1* | 3/2017 | Joshi | G11B 27/11 |

FOREIGN PATENT DOCUMENTS

| | | |
|---|---|---|
| JP | 2009-116787 A | 5/2009 |
| JP | 2010-227357 A | 10/2010 |
| JP | 2013-172959 A | 9/2013 |
| JP | 2018-509269 A | 4/2018 |
| JP | 2019-198457 A | 11/2019 |
| WO | 2010/122791 A1 | 10/2010 |
| WO | WO-2011052673 A1 * | 5/2011 ........... G06F 9/4446 |

OTHER PUBLICATIONS

The Anatomy of a List Entry by Salazar; Nielson Norman Group: World Leaders in Research-Based User Experience, https://www.nngroup.com/articles/list-entries/ (Year: 2016).*
Wizards: Definition and Design Recommendations by Budiu; Nielson Norman Group: World Leaders in Research-Based User Experience. https://www.nngroup.com/articles/wizards/ (Year: 2017).*
English translation of JP2009116787 AI (generated by PE2E on Aug. 13, 2024) (Year: 2024).*
English translation of JP2018509269 AI (generated by PE2E on Aug. 13, 2024) (Year: 2024).*
English translation of WO2011052673 A1 (generated by PE2E on Aug. 13, 2024) (Year: 2024).*
English translation of JP2008282086 AI (generated by PE2E on Aug. 13, 2024) (Year: 2024).*
International Search Report issued in PCT/JP2021/008887; mailed Apr. 20, 2021.
International Preliminary Report on Patentability and Written Opinion issued in PCT/JP2021/008887; issued Jan. 17, 2023.

* cited by examiner

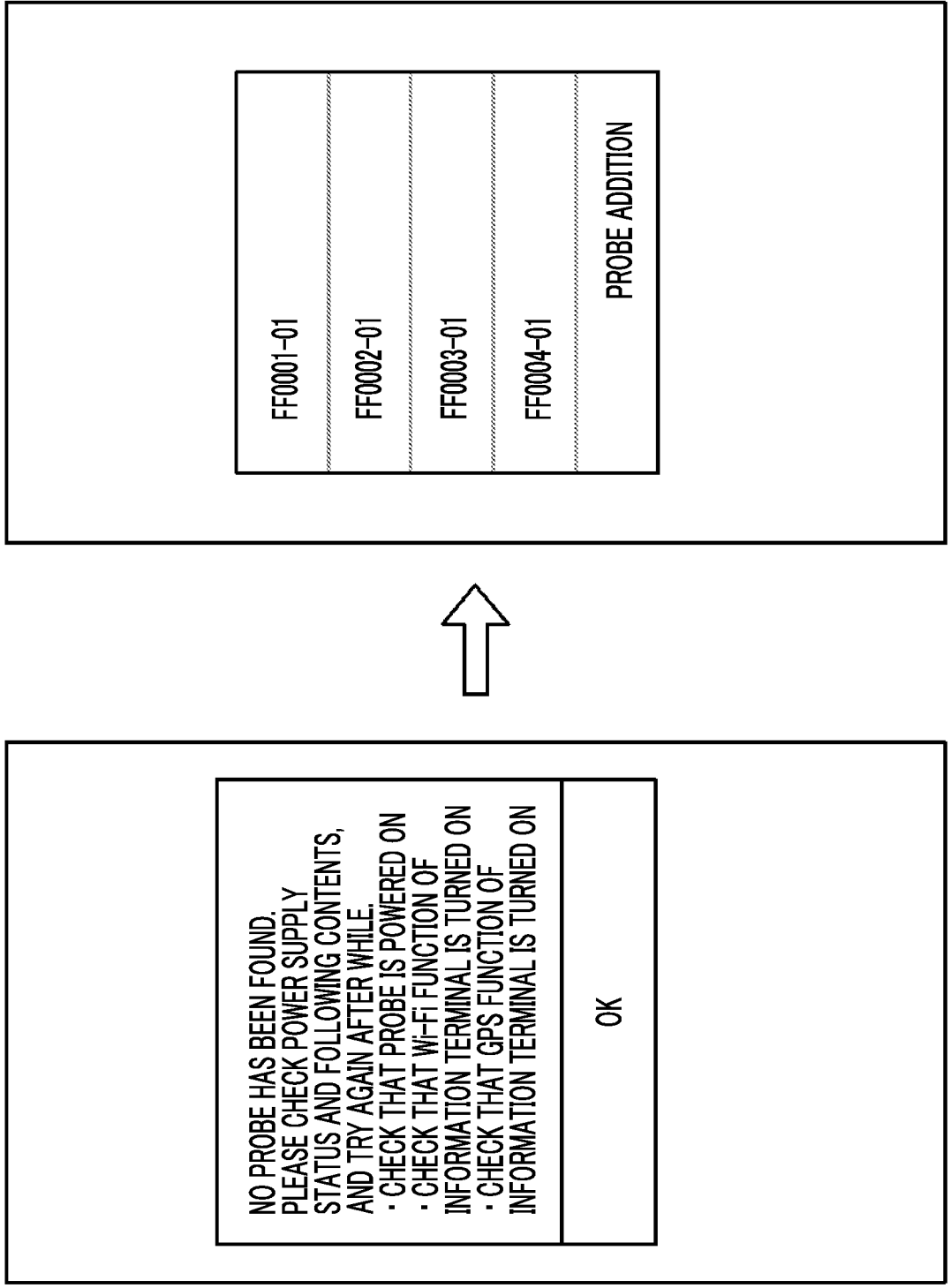

ULTRASOUND SYSTEM AND CONTROL METHOD OF ULTRASOUND SYSTEM

CROSS-REFERENCE TO RELATED APPLICATIONS

This application is a Continuation of PCT International Application No. PCT/JP2021/008887 filed on Mar. 8, 2021, which claims priority under 35 U.S.C. § 119(a) to Japanese Patent Application No. 2020-121906 filed on Jul. 16, 2020. The above applications are hereby expressly incorporated by reference, in its entirety, into the present application.

BACKGROUND OF THE INVENTION

1. Field of the Invention

The present invention relates to an ultrasound system in which an ultrasound probe and a handheld information terminal are connected in a wired or wireless manner, and a control method of the ultrasound system.

2. Description of the Related Art

In the related art, in the medical field, an ultrasound system using an ultrasound image has been put to practical use. In general, an ultrasound system comprises an ultrasound probe with a built-in transducer array, and an information terminal connected to the ultrasound probe, and the ultrasound system causes the ultrasound probe to transmit an ultrasound beam toward a subject, receives an ultrasound echo from the subject by the ultrasound probe, and electrically processes a reception signal thereof to generate an ultrasound image.

In recent years, portable and handheld ultrasound systems have been developed, as well as stationary ultrasound systems. The portable ultrasound system is an ultrasound-dedicated system in which an information terminal is realized by a laptop terminal device. On the other hand, in the handheld ultrasound system, an information terminal is realized by a handheld terminal device such as a smartphone or a tablet personal computer (PC), and an ultrasound diagnosis application program running on the terminal device.

Here, there are JP2009-116787A, JP2008-282086A, JP2001-084074A, JP2013-172959A, and JP2018-509269A as the documents in the related art that are references for the present invention.

JP2009-116787A relates to an information providing device and the like. JP2009-116787A discloses that a repeated operation by a user is detected, an operation history of the detected repeated operation is analyzed, an operation history stored in a storage unit such as an internal storage unit and an external storage unit is referred to from operation information that is stored corresponding to the operation history in the storage unit, the operation information corresponding to the operation history of the analyzed repeated operation is specified, and the specified operation information is output.

JP2008-282086A relates to an incorrect operation prevention device and the like. JP2008-282086A discloses that an operation that is performed on an operation screen by an operator is stored, the operation for which an error display was made on the operation screen among the stored operations and the number of the operations are counted, and in a case where a count value exceeds a predetermined value set in advance, control is performed such that a specific operation of which the count value exceeds the predetermined value cannot be performed on the operation screen or a message that the specific operation is incorrect.

JP2001-084074A relates to an incorrect operation prevention device of a medical apparatus. JP2001-084074A discloses that in the medical apparatus that has a soft key for executing desired processing by an operation of touching or clicking an operation button displayed on a screen of a display device, execution of the desired processing is started by continuing to operate the operation button for a predetermined time or by repeating the operation for a predetermined number of times within a predetermined time.

JP2013-172959A relates to a portable ultrasound imaging system and the like. JP2013-172959A discloses that, in the ultrasound imaging system including an ultrasound probe and a portable host system configured to receive information from the ultrasound probe, the host system displays the ultrasound probe specified by the host system, and an operator touches a corresponding icon to select one of the displayed probes.

JP2018-509269A relates to an ultrasound imaging system including an ultrasound imaging device and a versatile electronic display device. JP2018-509269A discloses the ultrasound imaging system which selects an ultrasound imaging device to be connected to the versatile electronic display device, among one or more ultrasound imaging devices on the basis of information and the like gathered from pre-stored information, a user's input, and the ultrasound imaging device, and displays ultrasound data received from the selected ultrasound imaging device.

SUMMARY OF THE INVENTION

Since the handheld ultrasound system has a smaller display screen as compared with the stationary and portable ultrasound systems, the information amount that can be notified to a user at once by displaying a message is limited.

On the other hand, in the ultrasound system, it is necessary to selectively use a plurality of ultrasound probes depending on an examination site. In the most stationary ultrasound systems in the related art, two or three ultrasound probes can be connected to an information terminal using a wired cable. A user selects an ultrasound probe to be used by a mechanical selection switch among the two or three ultrasound probes, or selects and uses a user interface (UI) on a display screen of the information terminal.

On the other hand, in the handheld ultrasound system, the ultrasound probe and the information terminal are connected, for example, in a wireless manner. In a case of wireless connection, whether or not the ultrasound probe that the user wants to connect matches the actually connected ultrasound probe cannot be visually checked by physical connection unlike in a case of wired connection, and it has to check the information of the wireless connection on the small display screen of the information terminal.

Further, unlike the case in which the ultrasound probe and the information terminal are connected using a wired cable of 2 to 3 m, in the case of the wireless connection, there is a possibility of wireless connection to an ultrasound probe located outside an examination room, for example, at a distance of 10 m or more within a range in which wireless radio waves reach. Therefore, although the user wants to connect to the ultrasound probe in hand, in some cases, the information terminal is connected to the ultrasound probe located far away outside the examination room without being connected to the ultrasound probe in hand.

In hospitals, many ultrasound probes that can be connected in a wireless manner are present at many locations. Therefore, even in a case where a nurse tries to connect the ultrasound probe in hand in a wireless manner, the connection may not be obtained well, and even in a case where the nurse repeats the same operation many times, the connection may not be obtained well. For example, although the user tries to perform an operation for connecting to the ultrasound probe in hand in a wireless manner, since the information terminal is actually connected to the ultrasound probe at a remote location and an ultrasound image is not displayed on the display screen of the information terminal, the user repeats the connection operation.

Example of the operation for wireless connection include an operation of displaying a list of names of registered ultrasound probes, selecting an ultrasound probe that the user wants to use, and performing connection, an operation of adding a new ultrasound probe, and the like.

However, in a case where the number of registered ultrasound probes is large and the names of all the ultrasound probes cannot be displayed at once due to the small display screen of the information terminal, a list including only the names of a predetermined number of ultrasound probes is displayed. The user scrolls through the names of the ultrasound probes displayed in the list so that the names of the undisplayed ultrasound probes, which are not displayed in the list, can be displayed.

In this case, the names of the ultrasound probes which are not displayed cannot be displayed unless the names of the ultrasound probes displayed in the list are scrolled, but in a case where the user is unaware of such operational constraints, the user repeats the operation of adding a new ultrasound probe.

For example, it is assumed that five or more ultrasound probes are registered, but a list including only the names of four ultrasound probes is displayed at once as illustrated in FIG. 13. The user can swipe the names of the display ultrasound probes in an up and down direction to display the name of the ultrasound probe that is not displayed. A scroll bar is displayed on the right end of the names of the ultrasound probes in a case of scrolling the names, but, according to the specifications, this scroll bar is only displayed for several seconds in a case where the names of the ultrasound probes are scrolled in the up and down direction.

However, the user may not be aware of such specification constraints. In a case where the user does not know that the names of the ultrasound probes displayed in the list can be scrolled, even in a case where the user tries to switch and use a plurality of ultrasound probes, the name of the ultrasound probe to be used is not displayed, so that the user repeats the operation of adding a new ultrasound probe assuming that the ultrasound probe to be used is not registered.

Alternatively, even in a case where it is checked that the power of the ultrasound probe is turned on and the scan button for scanning a subject by ultrasound beams is tapped or the probe switch button for switching the ultrasound probe to be used is tapped, the ultrasound image is not displayed. Further, even in a case where the ultrasound probe to be used is deleted from the registered ultrasound probes, and then is added again, and the scan button is tapped, the ultrasound image is not displayed. Therefore, the user gives up the wireless connection, and performs connection using a wired cable.

In this manner, in a case where a wireless connection error has occurred and the ultrasound image is not displayed, in order to resolve the wireless connection error, the user performs as many operations as can be imagined, such as those described above. However, since the problem of the specification constraints described above is an operation mistake by the user, which is a wireless connection error, but is not a real error, a message or the like for resolving the problem is not displayed. Therefore, the user cannot understand why the name of the ultrasound probe to be used is not displayed, and a situation where the error cannot be solved continues.

Thus, an object of the present invention is to provide an ultrasound system and a control method of the ultrasound system, which resolve the problem in the related art and can support a user to resolve a wireless connection error without repeating the same operation.

In order to achieve the object, an aspect of the present invention provides an ultrasound system comprising an ultrasound probe; and a handheld information terminal connected to the ultrasound probe in a wired or wireless manner, in which the information terminal includes an operation information storage unit that stores a plurality of pieces of operation information corresponding to an operation which is performed by a user for resolving a wireless connection error between the ultrasound probe and the information terminal, and an error processing unit that, in a case where the number of times of the operation corresponding to first operation information as at least one piece of the operation information among the plurality of pieces of operation information, which is performed by the user, has reached a predetermined number within a predetermined period, proposes second operation information as at least one piece of the operation information among the plurality of pieces of operation information, which corresponds to an operation that is not performed by the user, to the user.

It is preferable that in a case where the number of times of the operation has reached the predetermined number within the predetermined period, the error processing unit proposes an operation of connecting the ultrasound probe and the information terminal using a wired cable, as the second operation information.

It is preferable that in a case where a list including only names of a predetermined number of ultrasound probes among a group of the ultrasound probes that can be wirelessly connected to the information terminal is displayed and the number of times of the operation has reached the predetermined number within the predetermined period, the error processing unit proposes an operation of selecting an undisplayed ultrasound probe that is not included in the list among the group of the ultrasound probes, as the second operation information.

It is preferable that in a case where the number of times of the operation has reached the predetermined number within the predetermined period, the error processing unit proposes an operation of selecting a wizard-based ultrasound probe from the group of the ultrasound probes that can be wirelessly connected to the information terminal, as the second operation information.

It is preferable that in a case where the number of times of the operation has reached the predetermined number within the predetermined period, the error processing unit proposes an operation of selecting an untried ultrasound probe for which the wireless connection with the information terminal is not tried after the operation corresponding to the first operation information is performed by the user, from a group of the ultrasound probes that can be wirelessly connected to the information terminal, as the second operation information.

It is preferable that the error processing unit displays a list in which names of the untried ultrasound probes arranged from the top and which includes only the names of a predetermined number of the ultrasound probes.

It is preferable that the error processing unit highlights the name of the untried ultrasound probe.

It is preferable that the error processing unit displays a list in which only names of the untried ultrasound probes are arranged and which includes only the names of a predetermined number of the ultrasound probes.

It is preferable that the error processing unit displays the second operation information as a text message or a video.

It is preferable that the error processing unit reads the second operation information by sound.

Another aspect of the present invention provides a control method of an ultrasound system including an ultrasound probe, and a handheld information terminal connected to the ultrasound probe in a wired or wireless manner, the control method comprising storing a plurality of pieces of operation information corresponding to an operation which is performed by a user for resolving a wireless connection error between the ultrasound probe and the information terminal, by an operation information storage unit of the information terminal; and proposing, in a case where the number of times of the operation corresponding to first operation information as at least one piece of the operation information among the plurality of pieces of operation information, which is performed by the user, has reached a predetermined number within a predetermined period, second operation information as at least one piece of the operation information among the plurality of pieces of operation information, which corresponds to an operation that is not performed by the user, to the user by an error processing unit of the information terminal.

In the present invention, in order to resolve the wireless connection error, in a case where the number of times of the operation corresponding to the first operation information, which is performed by the user, has reached the predetermined number within the predetermined period, the second operation information corresponding to an operation that has not been performed by the user is proposed to the user, and therefore, the user can perform the operation corresponding to the second operation information after performing the operation corresponding to the first operation information a predetermined number of times within a predetermined period. Therefore, according to the present invention, it is possible to support the user to resolve the wireless connection error without repeating the same operation.

A left side of FIG. 14 is a conceptual diagram of a display screen of a monitor illustrating information on a type of an error and first operation information, and a right side of FIG. 14 is a conceptual diagram of a display screen of a monitor illustrating a list of registered ultrasound probes.

DESCRIPTION OF THE PREFERRED EMBODIMENTS

Hereinafter, an ultrasound system and a control method of the ultrasound system according to the present invention will be described in detail on the basis of preferred embodiments illustrated in the accompanying drawings.

Figure 1:
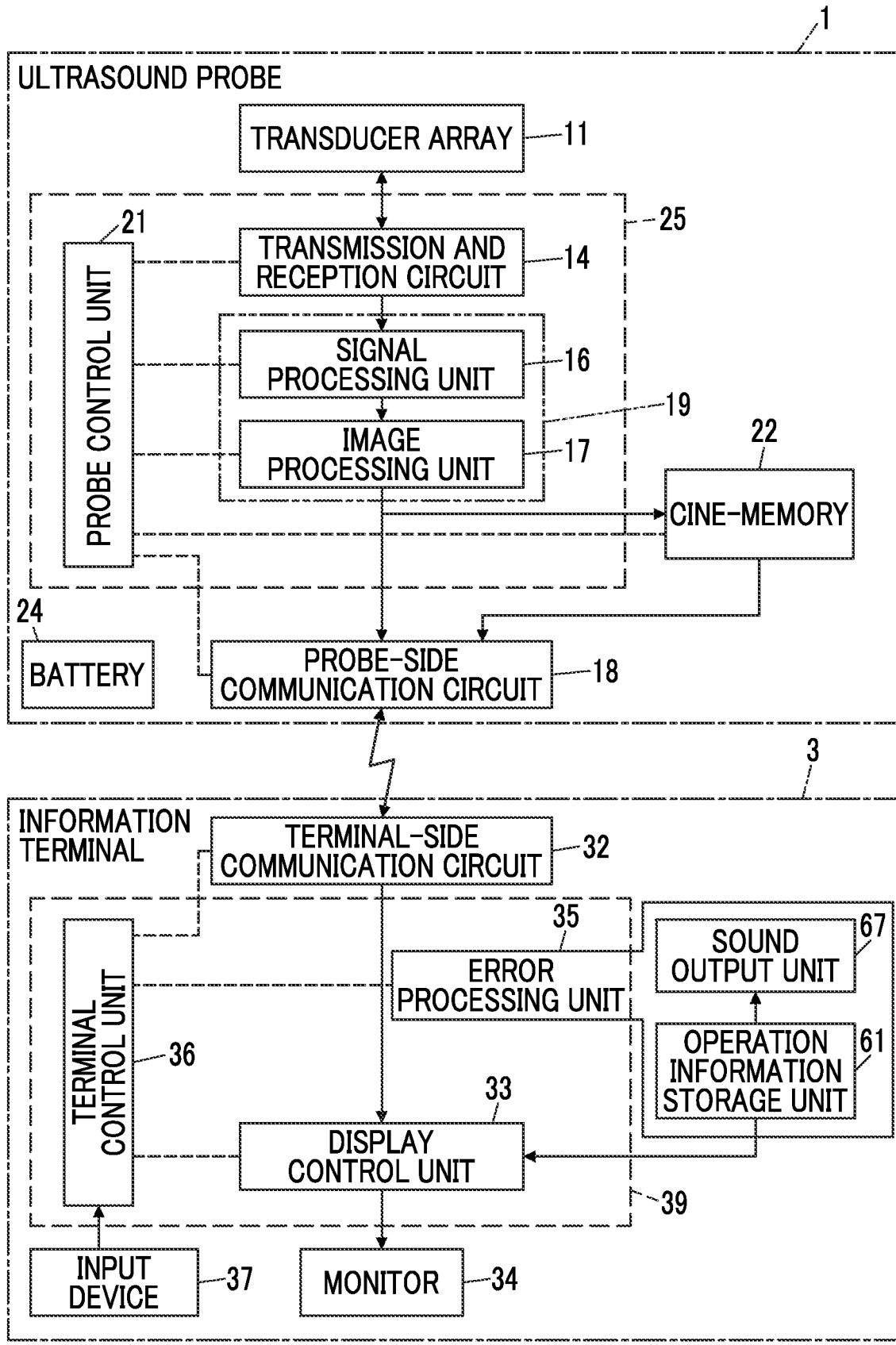
FIG. 1 is a block diagram illustrating a configuration of an ultrasound system of an embodiment according to the present invention.

FIG. 1 is a block diagram illustrating a configuration of an ultrasound system of an embodiment according to the present invention. The ultrasound system illustrated in FIG. 1 comprises an ultrasound probe 1, and a handheld information terminal 3 connected to the ultrasound probe 1 in a wired or wireless manner. The ultrasound system of the present embodiment is realized by the ultrasound probe 1, the handheld information terminal 3, and an ultrasound diagnosis application program running on the information terminal 3.

The ultrasound probe 1 captures an ultrasound image by scanning a subject using ultrasound beams, and outputs data corresponding to the ultrasound image, that is, image information data of the ultrasound image in the case of the present embodiment. As illustrated in FIG. 1, the ultrasound probe 1 comprises a transducer array 11, a transmission and reception circuit 14, a signal processing unit 16, an image processing unit 17, a probe-side communication circuit 18, a probe control unit 21, a cine-memory 22, and a battery 24.

The transmission and reception circuit 14 is bidirectionally connected to the transducer array 11. The signal processing unit 16, the image processing unit 17, and the probe-side communication circuit 18 are sequentially connected in series to the transmission and reception circuit 14. The signal processing unit 16 and the image processing unit 17 constitute an image information data generation unit 19. Further, the cine-memory 22 is connected to the image processing unit 17, and the probe-side communication circuit 18 is connected to the cine-memory 22.

Further, the probe control unit 21 is connected to the transmission and reception circuit 14, the signal processing unit 16, the image processing unit 17, the cine-memory 22, and the probe-side communication circuit 18. The battery 24 is built in the ultrasound probe 1.

The transmission and reception circuit 14, the image information data generation unit 19 (the signal processing unit 16 and the image processing unit 17), and the probe control unit 21 constitute a probe-side processor 25.

The transducer array 11 has a plurality of ultrasonic transducers arranged in a one-dimensional or two-dimensional manner. According to a drive signal supplied from the transmission and reception circuit 14, each of the transducers transmits an ultrasonic wave and receives a reflected wave from the subject to output an analog reception signal.

For example, each transducer is formed by using an element in which electrodes are formed at both ends of a piezoelectric body consisting of piezoelectric ceramic represented by lead zirconate titanate (PZT), a polymer piezoelectric element represented by poly vinylidene di fluoride (PVDF), piezoelectric single crystal represented by lead magnesium niobate-lead titanate (PMN-PT), or the like.

Figure 2:
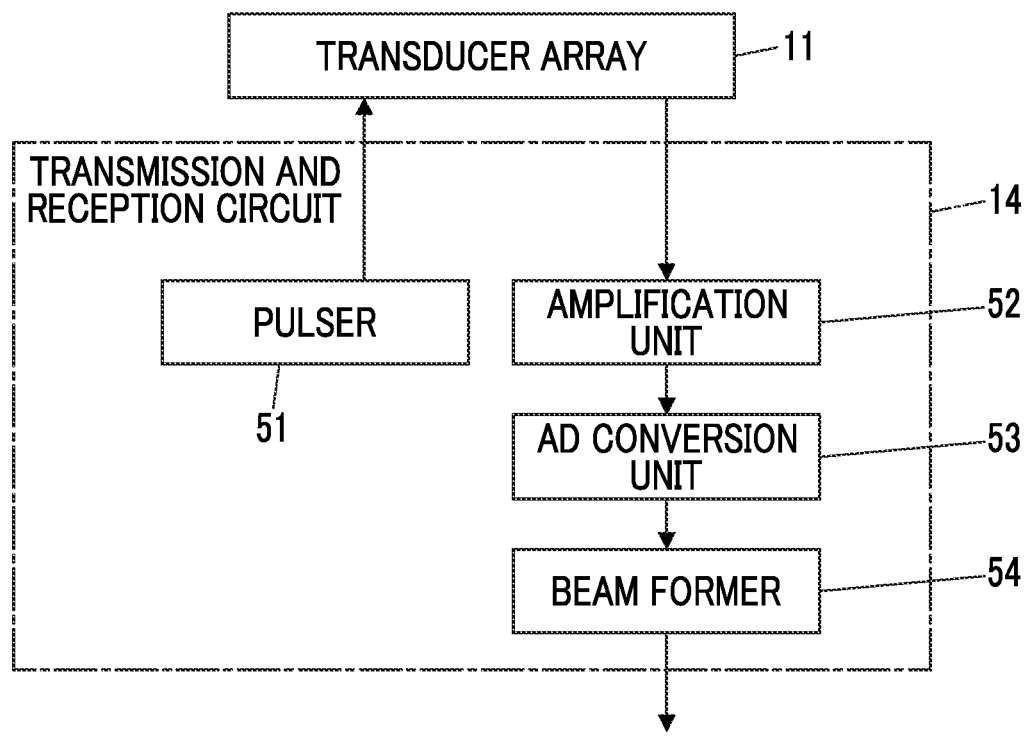
FIG. 2 is a block diagram illustrating a configuration of a transmission and reception circuit.
Figure 3:
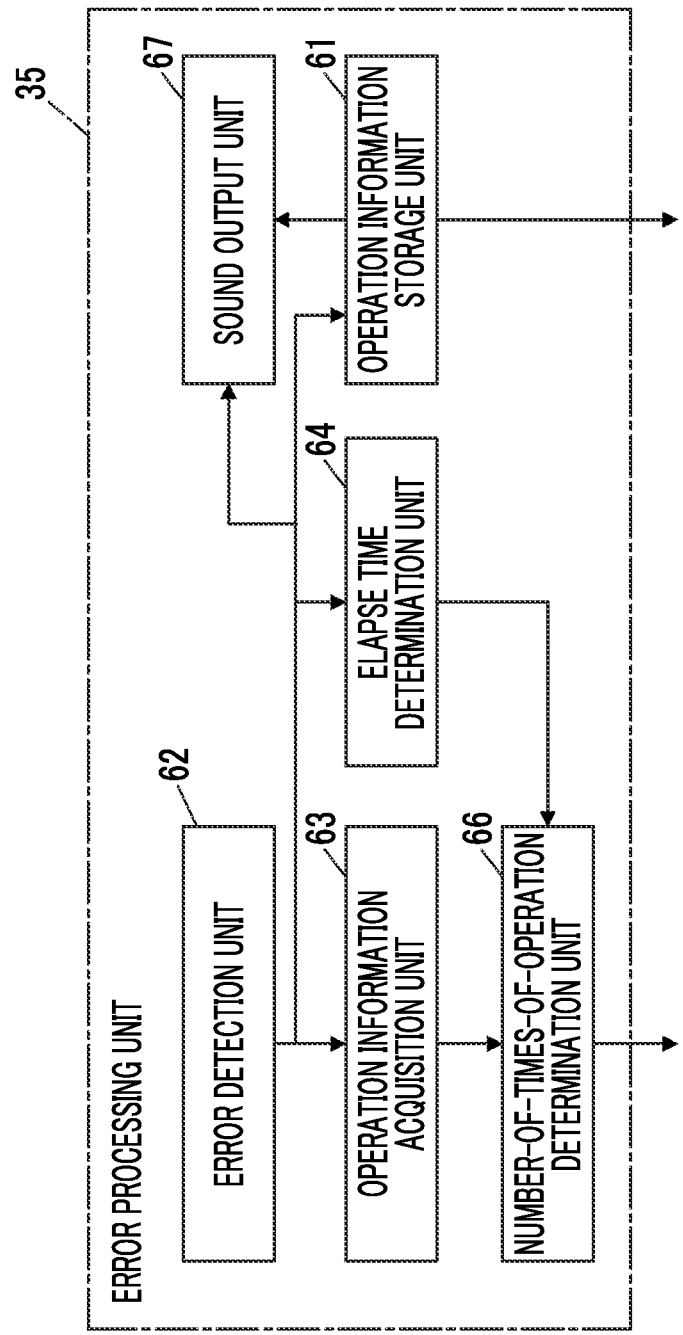
FIG. 3 is a block diagram illustrating a configuration of an error processing unit.

The transmission and reception circuit 14 causes the transducer array 11 to transmit the ultrasonic wave, and performs reception focusing processing on the reception signal output from the transducer array 11 that has received the ultrasound echo to generate a sound ray signal, under the control of the probe control unit 21. As illustrated in FIG. 2, the transmission and reception circuit 14 has a pulser 51 connected to the transducer array 11, and an amplification unit 52, an analog digital (AD) conversion unit 53, and a beam former 54 that are sequentially connected in series from the transducer array 11.

The pulser 51 includes, for example, a plurality of pulse generators, and the pulser 51 adjusts the amount of delay of each drive signal so that ultrasonic waves transmitted from the plurality of transducers of the transducer array 11 form an ultrasound beam on the basis of a transmission delay pattern selected by the probe control unit 21, and supplies the obtained signals to the plurality of transducers. Thus, in a case where a pulsed or continuous-wave voltage is applied to the electrodes of the transducers of the transducer array 11, the piezoelectric body expands and contracts to generate pulsed or continuous-wave ultrasonic waves from each transducer. From the combined wave of these ultrasonic waves, an ultrasound beam is formed.

The transmitted ultrasound beam is reflected by a target, for example, a site of the subject, and propagates toward the transducer array 11 of the ultrasound probe 1. Each transducer constituting the transducer array 11 expands and contracts by receiving the ultrasound echo propagating toward the transducer array 11 in this manner, to generate the reception signal that is an electric signal, and outputs the reception signal to the amplification unit 52.

The amplification unit 52 amplifies the signals input from each transducer constituting the transducer array 11, and transmits the amplified signals to the AD conversion unit 53. The AD conversion unit 53 converts the signal transmitted from the amplification unit 52 into digital reception data, and outputs the reception data to the beam former 54.

The beam former 54 performs so-called reception focusing processing in which addition is performed by giving delays to respective pieces of the reception data converted by the AD conversion unit 53 according to a sound speed distribution or a sound speed set on the basis of a reception delay pattern selected by the probe control unit 21. Through the reception focusing processing, a sound ray signal in which each piece of the reception data converted by the AD conversion unit 53 is phased and added and the focus of the ultrasound echo is narrowed is generated.

The image information data generation unit 19 generates image information data on the basis of the sound ray signal generated by the transmission and reception circuit 14. The image information data generation unit 19 has the signal processing unit 16 and the image processing unit 17 as described above.

The signal processing unit 16 generates image signal data before imaging into the ultrasound image, on the basis of the sound ray signal generated by the transmission and reception circuit 14, under the control of the probe control unit 21. More specifically, the signal processing unit 16 generates, as the image signal data before imaging, a signal representing tomographic image information regarding tissues inside the subject, by performing envelope detection processing after signal processing, for example, correcting the attenuation of the sound ray signal generated by the beam former 54 of the transmission and reception circuit 14, which is caused by the propagation distance according to the depth of the reflection position of the ultrasonic wave.

The image processing unit 17 generates the ultrasound image as the image information data generated by the image information data generation unit 19 on the basis of the image signal data generated by the signal processing unit 16, under the control of the probe control unit 21. More specifically, the image processing unit 17 raster-converts the image signal data before imaging, which is generated by the signal processing unit 16 into the image signal according to a normal television signal scanning method, performs various kinds of image processing such as brightness correction, gradation correction, sharpness correction, image size correction, refresh rate correction, scanning frequency correction, and color correction according to a display format of a monitor 34, on the image signal converted in this manner to generate the ultrasound image (ultrasound image signal), and then outputs the generated ultrasound image as the image information data to the probe-side communication circuit 18.

The cine-memory 22 stores the image information data generated by the image information data generation unit 19, under the control of the probe control unit 21. More specifically, the cine-memory 22 stores the ultrasound image generated by the image processing unit 17 of the image information data generation unit 19, as the image information data in the case of the live mode. The cine-memory 22 has a memory capacity for storing ultrasound images of several tens to several hundreds of frames in a case where ultrasound images for several seconds to several tens of seconds, for example, ultrasound images of 30 frames for one second are captured.

The cine-memory 22 is a ring buffer. Thus, in a case where the ultrasound images of past frames for the number of frames corresponding to the memory capacity are stored in the cine-memory 22, instead of the ultrasound image of the oldest frame, the ultrasound image of the latest frame is sequentially stored in the cine-memory 22. In this manner, the ultrasound images of the past frames for the number of frames corresponding to the memory capacity, from the ultrasound image of the latest frame are always stored in the cine-memory 22.

Here, the live mode is a mode in which the ultrasound images (video) captured at a certain frame rate are sequentially displayed (real time display).

A freeze mode is a mode in which the ultrasound images (video) captured in the case of the live mode are stored in the cine-memory 22 and the ultrasound images (static image) of any frames are read out and displayed from the ultrasound images (video) of the past frames stored in the cine-memory 22.

The probe-side communication circuit 18 transmits the image information data generated by the image processing unit 17 or the image information data stored in the cine-memory 22 in a wired or wireless manner under the control of the probe control unit 21.

In the present embodiment, the probe-side communication circuit 18 includes an antenna for transmitting and receiving radio waves, modulates a carrier on the basis of the ultrasound image generated by the image processing unit 17 to generate a transmission signal, and transmits radio waves from the antenna by supplying the transmission signal to the antenna to perform wireless transmission of the ultrasound image.

As the modulation method of the carrier, amplitude shift keying (ASK), phase shift keying (PSK), quadrature phase shift keying (QPSK), 16 quadrature amplitude modulation (16QAM), or the like is used.

Further, the probe-side communication circuit 18 can also connect the ultrasound probe 1 and the information terminal 3 in a wired manner using a cable such as a Universal Serial Bus (USB) cable.

The probe-side communication circuit 18 wirelessly transmits the image information data of the frame generated by the image information data generation unit 19 in the case of the live mode, and wirelessly transmits the image information data stored in the cine-memory 22 in the case of the freeze mode.

The probe control unit 21 controls each unit of the ultrasound probe 1 on the basis of a program and the like stored in advance. More specifically, the probe control unit 21 controls the transmission and reception circuit 14 such that transmission of ultrasound beams and reception of ultrasound echoes are performed on the basis of an examination mode and a scanning method set in advance. The probe control unit 21 controls the signal processing unit 16 and the image processing unit 17 of the image information data generation unit 19 such that signal processing set in advance is performed on the sound ray signal and the image processing set in advance is performed on the image signal data. The probe control unit 21 performs control such that the image information data generated by the image information data generation unit 19 is stored in the cine-memory 22 in the case of the live mode, and the ultrasound image of the past frame stored in the cine-memory 22 is read out in the case of the freeze mode. Further, the probe control unit 21 controls the probe-side communication circuit 18 such that the image signal data is transmitted with a transmission radio field intensity set in advance.

Here, the examination mode indicates any of examination modes that can be used in the ultrasound system, such as a brightness (B) mode, a color Doppler (CF) mode, a power Doppler (PD) mode, a motion (M) mode, a pulse wave Doppler (PW) mode, and a continuous wave Doppler (CW) mode, and the scanning method indicates any one of scanning methods such as an electronic sector scanning method, an electronic linear scanning method, and an electronic convex scanning method.

The battery 24 is built in the ultrasound probe 1, and supplies power to each circuit of the ultrasound probe 1.

Next, the information terminal 3 is a handheld terminal device such as a smartphone and a tablet PC, and displays the ultrasound image on the basis of data corresponding to the ultrasound image captured by the ultrasound probe 1. As illustrated in FIG. 1, the information terminal 3 comprises a terminal-side communication circuit 32, a display control unit 33, an error processing unit 35, a terminal control unit 36, a monitor (display unit) 34, and an input device 37.

The display control unit 33 and the monitor 34 are sequentially connected in series to the terminal-side communication circuit 32. Further, the terminal control unit 36 is connected to the terminal-side communication circuit 32, the display control unit 33, and the error processing unit 35. The input device 37 is connected to the terminal control unit 36.

In the present embodiment, the probe-side communication circuit 18 of the ultrasound probe 1 and the terminal-side communication circuit 32 of the information terminal 3 are connected in a wireless manner by wireless communication, and the ultrasound probe 1 and the information terminal 3 are connected so that the information can be bidirectionally delivered.

The terminal-side communication circuit 32 receives the image information data transmitted from the probe-side communication circuit 18 of the ultrasound probe 1 in a wired or wireless manner, under the control of the terminal control unit 36. In the present embodiment, the terminal-side communication circuit 32 includes an antenna for transmitting and receiving radio waves, receives a transmission signal wirelessly transmitted from the probe-side communication circuit 18 via the antenna, demodulates the received transmission signal, and outputs the ultrasound image (ultrasound image signal) as the image information data.

The display control unit 33 displays various kinds of information on the monitor 34 under the control of the terminal control unit 36. The display control unit 33 displays the ultrasound image on the monitor 34 on the basis of the image information data received by the terminal-side communication circuit 32, for example. More specifically, the display control unit 33 performs predetermined processing on the ultrasound image as the image information data to display the processed ultrasound image on the monitor 34. Further, in a case where an error has occurred in the ultrasound system, the display control unit 33 displays information on the type of the error that has occurred, and operation information or the like for resolving the error on the monitor 34.

Figure 4:
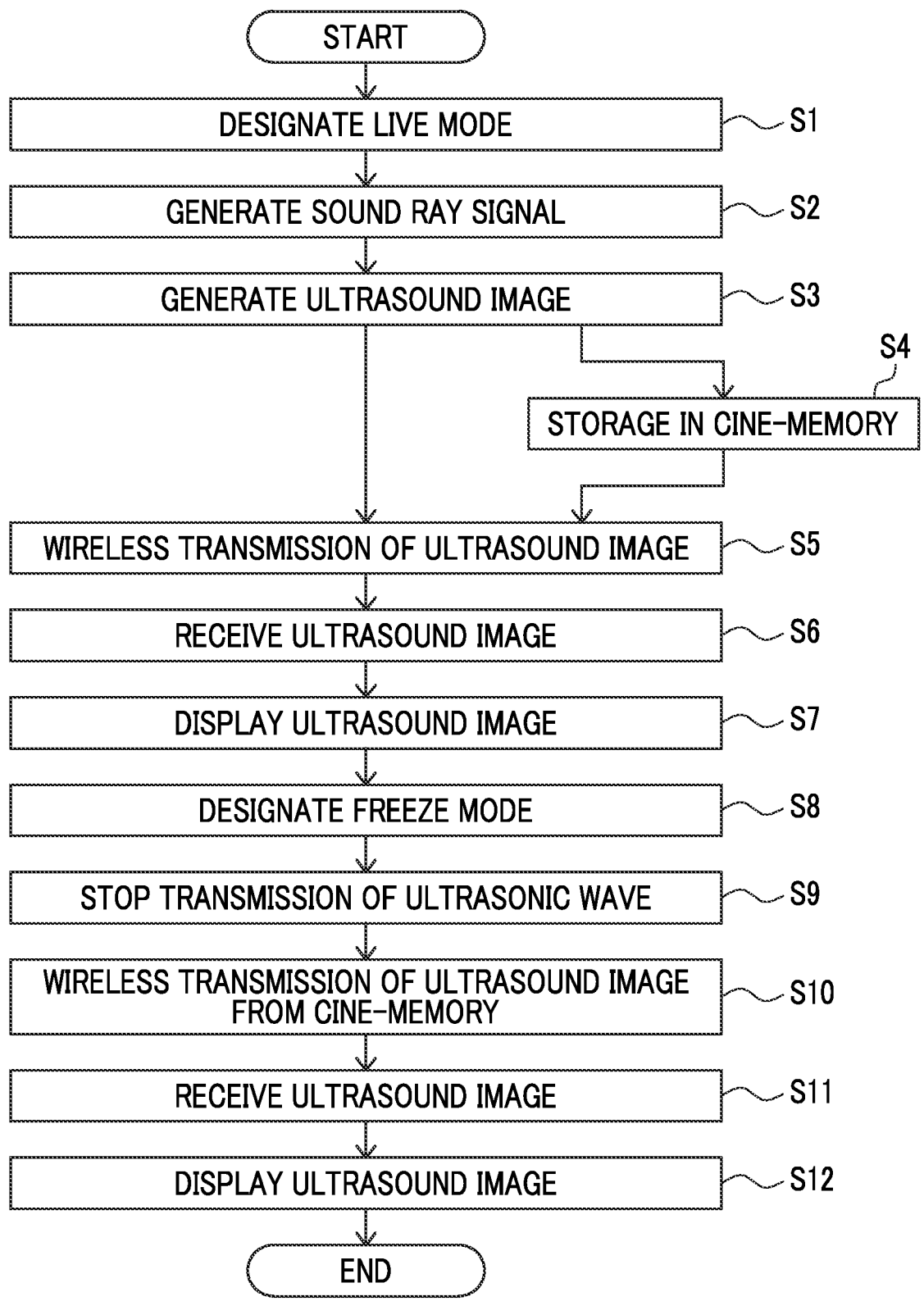
FIG. 4 is a flowchart illustrating an operation of the ultrasound system.

In a case where the occurrence of the error is detected in the ultrasound system, the error processing unit 35 displays the information on the type of the error that has occurred, and proposes the operation information or the like for resolving the error to a user (operator of the ultrasound system), under the control of the terminal control unit 36. As illustrated in FIG. 4, the error processing unit 35 comprises an operation information storage unit 61, an error detection unit 62, an operation information acquisition unit 63, an elapse time determination unit 64, a number-of-times-of-operation determination unit 66, and a sound output unit 67.

The type of the error is not particularly limited, but includes, for example, an error at the time of wireless connection or connection using a wired cable between the ultrasound probe 1 and the information terminal 3, an error at the time of inputting patient information of a patient for which the ultrasound image is to be captured, and an error such as an operation mistake and a setting mistake by the user in addition to the failure of the ultrasound system.

The operation information is various kinds of information (advice) to be proposed to the user in order to resolve an error that has occurred in a case where the error has occurred, and includes information on an operation procedure or the like that the user performs for resolving the error. The operation information may be a text message, a video, sound, or the like, and is not particularly limited. However, for example, the operation information for resolving the wireless connection error includes information on an operation of tapping a scan button of the ultrasound diagnosis application program, an operation of tapping a probe addition button, an operation of tapping a probe switch button, and the like.

The operation information acquisition unit 63 and the number-of-times-of-operation determination unit 66 are sequentially connected in series to the error detection unit 62. Further, the elapse time determination unit 64 is connected to the error detection unit 62, and the number-of-times-of-operation determination unit 66 is connected to the elapse time determination unit 64. The sound output unit 67 is connected to the operation information storage unit 61 and the error detection unit 62. The operation information storage unit 61 is connected to the error detection unit 62, and the display control unit 33 is connected to the operation information storage unit 61 and the number-of-times-of-operation determination unit 66.

The operation information storage unit 61 stores a plurality of pieces of operation information corresponding to the operation performed by the user for resolving the error, for each type of the error occurring in the ultrasound system. The operation information storage unit 61 stores a plurality of pieces of operation information corresponding to the operation performed by the user for resolving the wireless connection error, for example.

The error detection unit 62 detects whether or not an error has occurred in the ultrasound system. The error detection unit 62 detects whether or not a wireless connection error including an error such as an operation mistake and a setting mistake has occurred.

A method of detecting the occurrence of an error is not particularly limited, but includes, for example, checking whether or not the setting of the wireless connection between the ultrasound probe 1 and the information terminal 3 is correct, detecting whether or not the ultrasound probe 1 and the information terminal 3 are connected in a wired manner, detecting whether or not the input of the patient information is correct, and the like. Further, in a case where the number of times of the operation corresponding to the operation information, which is performed by the user, has reached the predetermined number within the predetermined period after the first operation for resolving the error is performed by the user, it may be detected that the error has occurred.

In a case where the occurrence of the error is detected by the error detection unit 62, the operation information acquisition unit 63 acquires the user operation information that is information on the operation performed by the user who reads the operation information for resolving the error that has occurred.

The operation of the user is not particularly limited, but includes, for example, an operation of performing the setting of the wireless connection between the ultrasound probe 1 and the information terminal 3, an operation of connecting the ultrasound probe 1 and the information terminal 3 using a wired cable, an operation of re-inputting the correct patient information, and the like.

The elapse time determination unit 64 determines whether or not an elapse time from the detection of the occurrence of the error has passed a predetermined period.

The elapse time determination unit 64 measures the elapse time using a timer or the like, and determines whether the measured elapse time has passed the predetermined period, for example, two minutes.

In a case where the elapse time determination unit 64 determines that the elapse time has not elapsed the predetermined period, the number-of-times-of-operation determination unit 66 determines whether or not the number of times of the operation corresponding to the operation information, which is performed by the user, has reached a predetermined number within the predetermined period on the basis of the user operation information acquired by the operation information acquisition unit 63.

For example, the number-of-times-of-operation determination unit 66 counts the number of times the setting of the wireless connection of the information terminal 3 is performed by the user within the predetermined period from the detection of the occurrence of the error, using a counter or the like, and determines whether or not the count value has reached the predetermined number, for example, two.

The sound output unit 67 reads out various kinds of information by sound, and includes, for example, a speaker, earphones, headphones, and the like.

The terminal control unit 36 controls each unit of the information terminal 3 on the basis of a program stored in advance and an instruction or the like of the user input from the input device 37. More specifically, the terminal control unit 36 controls the terminal-side communication circuit 32 such that the reception of the transmission signal from the probe-side communication circuit 18 of the ultrasound probe 1 is performed. Further, the terminal control unit 36 controls the display control unit 33 such that the ultrasound image is displayed on the monitor 34 on the basis of the image information data. In a case where an error has occurred, the terminal control unit 36 controls the error processing unit 35 to propose the operation information for resolving the error that has occurred, to the user.

The display control unit 33, the error detection unit 62, the operation information acquisition unit 63, the elapse time determination unit 64, and the number-of-times-of-operation determination unit 66 of the error processing unit 35, and the terminal control unit 36 constitute a terminal-side processor 39.

The monitor 34 displays various kinds of information. The monitor 34 displays, for example, the information on the type of the error, the operation information, and the ultrasound image generated by the display control unit 33.

Examples of the monitor 34 include a display device such as a liquid crystal display (LCD), and an organic electroluminescence (EL) display.

The input device 37 is for the user to perform an input operation to input various instructions, and includes a touch panel and the like by which the user can perform a touch operation to input various instructions, in the present embodiment.

Next, the operation of the ultrasound system will be described with reference to the flowchart of FIG. 4. First, the operation of the ultrasound system in the case of the live mode will be described.

In a case where the live mode is designated on the basis of the user's instruction input from the input device 37 (Step S1), in a state where the ultrasound probe 1 is in contact with the body surface of the subject, the transmission of the ultrasonic waves is started by the transmission and reception circuit 14, and the sound ray signal is generated (Step S2).

That is, under the control of the probe control unit 21, ultrasound beams are transmitted into the subject from the plurality of transducers of the transducer array 11 according to the drive signal from the pulser 51 of the transmission and reception circuit 14.

Ultrasound echoes from the subject based on the ultrasound beams transmitted from the pulser 51 are received by each transducer of the transducer array 11, and the reception signal as an analog signal is output from each transducer of the transducer array 11, which has received the ultrasound echo.

The reception signal as the analog signal output from each transducer of the transducer array 11 is amplified by the amplification unit 52 of the transmission and reception circuit 14, and is subjected to AD conversion by the AD conversion unit 53, and thereby the reception data is acquired.

By performing the reception focusing processing on the reception data by the beam former 54, the sound ray signal is generated.

Next, the ultrasound image is generated as the image information data by the image information data generation unit 19 on the basis of the sound ray signal generated by the beam former 54 of the transmission and reception circuit 14 (Step S3).

That is, the sound ray signal generated by the beam former 54 is subjected to various kinds of signal processing by the signal processing unit 16 of the image information data generation unit 19, and the signal representing tomographic image information regarding tissues inside the subject is generated as the image signal data before imaging.

The image signal data generated by the signal processing unit 16 is raster-converted by the image processing unit 17, and is further subjected to various kinds of image processing, and the ultrasound image is generated as the image information data.

The ultrasound image generated by the image processing unit 17 is stored in the cine-memory 22 (Step S4).

Further, the ultrasound image generated by the image processing unit 17 is wirelessly transmitted from the probe-side communication circuit 18 to the information terminal 3 (Step S5).

Next, the ultrasound image wirelessly transmitted from the probe-side communication circuit 18 of the ultrasound probe 1 is received by the terminal-side communication circuit 32 under the control of the terminal control unit 36 of the information terminal 3 (Step S6).

Next, the display control unit 33 performs predetermined processing on the ultrasound image received by the terminal-side communication circuit 32 to display the processed ultrasound image on the monitor 34 (Step S7).

That is, in the case of the live mode, as the image information data, the ultrasound image generated by the image processing unit 17 of the image information data generation unit 19 of the ultrasound probe 1 is wirelessly transmitted from the probe-side communication circuit 18. On the other hand, the display control unit 33 of the information terminal 3 displays the ultrasound image received by the terminal-side communication circuit 32 on the monitor 34.

Next, the operation of the ultrasound system in the case of the freeze mode will be described.

In a case where the freeze mode is designated on the basis of the user's instruction input from the input device 37 (Step S8), the transmission of the ultrasonic waves from the transducer array 11 is stopped (Step S9).

In this case, as the image information data, the ultrasound images of the past frames stored in the cine-memory 22 are read out and wirelessly transmitted from the probe-side communication circuit 18 (Step S10).

Next, the ultrasound image wirelessly transmitted from the probe-side communication circuit 18 is received by the terminal-side communication circuit 32 (Step S11).

Next, the display control unit 33 displays the ultrasound image of the past frame received by the terminal-side communication circuit 32 on the monitor 34 (Step S12).

Figure 5:
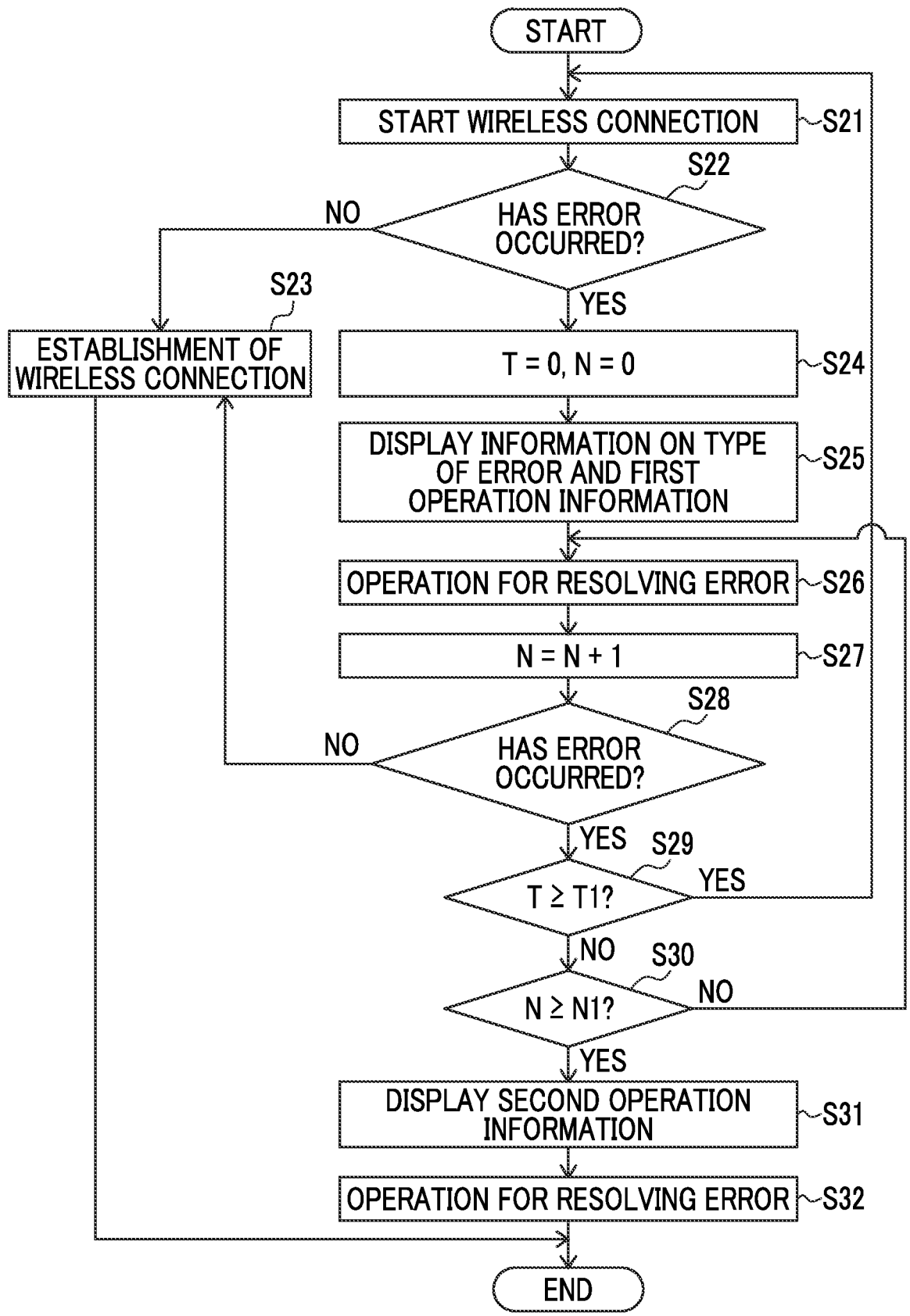
FIG. 5 is a flowchart illustrating an operation of the ultrasound system in a case where the ultrasound probe and the information terminal are wirelessly connected.

Next, the operation of the ultrasound system in a case where the ultrasound probe 1 and the information terminal 3 are wirelessly connected will be described with reference to the flowchart of FIG. 5.

First, the user wirelessly connects the ultrasound probe 1 and the information terminal 3 (Step S21). In this case, for example, the user selects the ultrasound probe 1 to be used, from the list of a plurality of registered ultrasound probes by tapping the ultrasound probe 1.

In a case where the ultrasound probe 1 to be used is selected, whether or not a wireless connection error has occurred between the ultrasound probe 1 and the information terminal 3 is detected by the error detection unit 62 (Step S22).

As a result, in a case where the occurrence of the error is not detected (NO in Step S22), the wireless connection between the ultrasound probe 1 and the information terminal 3 is established (Step S23). In this manner, the ultrasound image corresponding to the image information data, which is transmitted from the ultrasound probe 1 and is received by the information terminal 3, is displayed on the monitor 34.

On the other hand, in a case where the occurrence of the error is detected (YES in Step S22), an elapse time T is set to T=0 (initialized) by the elapse time determination unit 64, and the number of times of the operation N is set to N=0 (initialized) by the number-of-times-of-operation determination unit 66 (Step S24).

Figure 6:
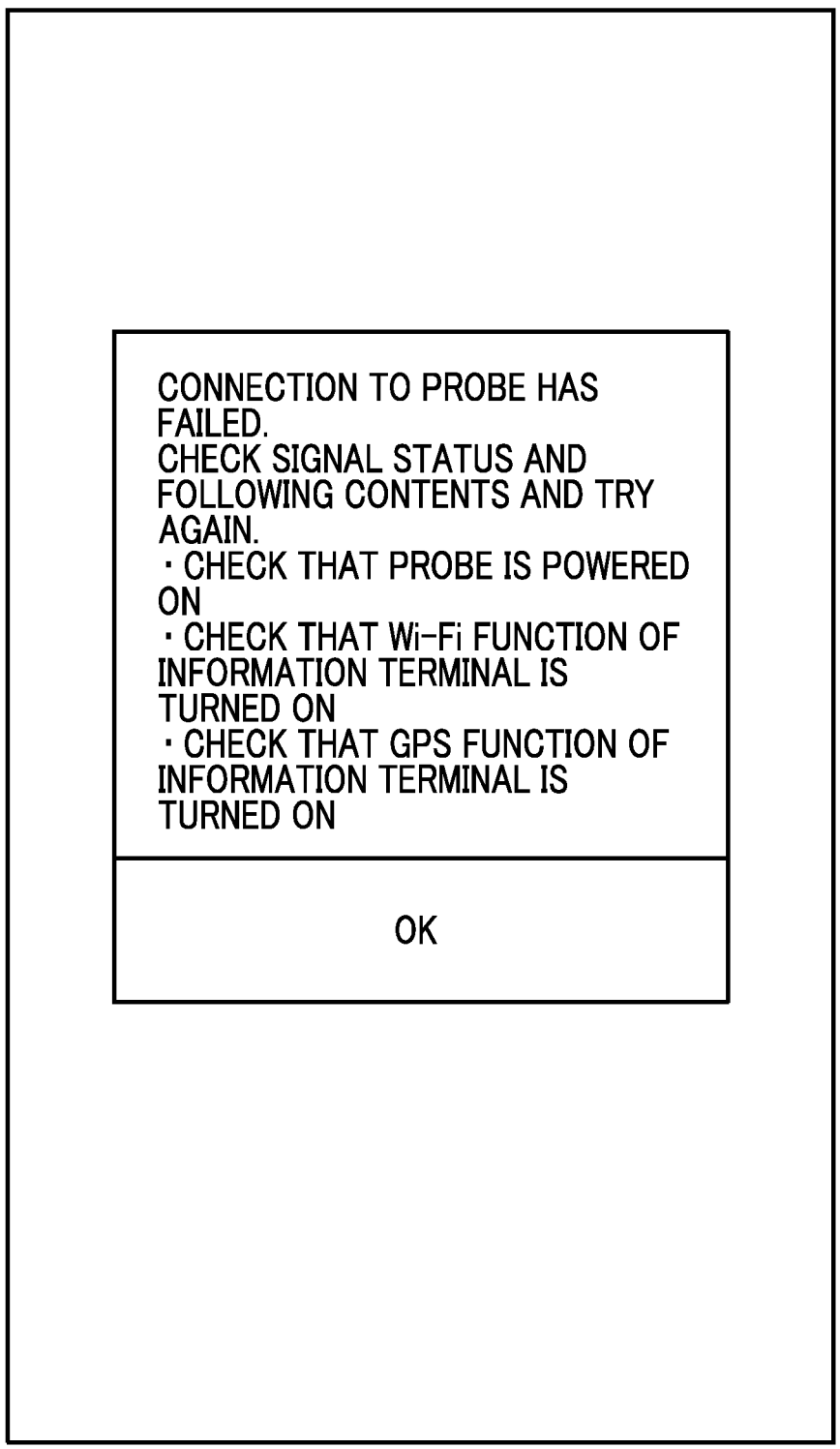
FIG. 6 is a conceptual diagram of a display screen of a monitor illustrating information on a type of an error and first operation information.

A plurality of pieces of operation information corresponding to the wireless connection error are read out from the operation information storage unit 61, and the first operation information that is at least one piece of the operation information is selected from the pieces of operation information with a high priority among the plurality of pieces of read operation information. Then, as illustrated in FIG. 6, the information on the type of the error that has occurred and the first operation information are displayed on the monitor 34 by the display control unit 33 (Step S25).

The user reads the information on the type of the error displayed on the monitor 34, understands that a wireless connection error has occurred between the ultrasound probe 1 and the information terminal 3, similarly reads the first operation information, and performs an operation corresponding to the first operation information for resolving the error (Step S26). In a case where an operation corresponding to the first operation information is performed by the user, the user operation information is acquired by the operation information acquisition unit 63.

In a case where it is found that the operation corresponding to the first operation information is performed by the user on the basis of the user operation information, the number of times of the operation N is set to N=N+1 by the number-of-times-of-operation determination unit 66 (Step S27).

Whether or not a wireless connection error has occurred between the ultrasound probe 1 and the information terminal 3, that is, whether or not the error is resolved by the user's operation is detected by the error detection unit 62 (Step S28).

As a result, in a case where the occurrence of the error is not detected (NO in Step S28), that is, in a case where the error is resolved by the user's operation, the processing proceeds to Step S23, and the ultrasound image is displayed on the monitor 34.

On the other hand, in a case where it is detected that an error has occurred (YES in Step S28), that is, in a case where the error is not resolved by the user's operation, subsequently, whether or not the elapse time T from the detection of the occurrence of the error has passed a predetermined period T1, for example, two minutes (T≥T1?) is determined by the elapse time determination unit 64 (Step S29).

As a result, in a case where the elapse time T has passed the predetermined period T1 (YES in Step S29), the processing returns to Step S21, and starts again from the beginning. It means that, in a case where the elapse time T has passed the predetermined period T1, the same operation is not repeatedly performed by the user in a short time, in other words, the user starts again the wireless connection from the beginning so that the same operation is performed, for example, after one hour or the next day from the detection of the occurrence of the error.

On the other hand, in a case where the elapse time T has not passed the predetermined period T1 (NO in Step S29), whether or not the number of times of the operation N has reached a predetermined number N1, for example, two (N≥N1?) is determined by the number-of-times-of-operation determination unit 66 (Step S30).

As a result, in a case where the number of times of the operation N has not reached the predetermined number N1 (NO in Step S30), the processing proceeds to Step S26. Thus, the user performs again the operation corresponding to the first operation information, for example. That is, the user repeats the same operation.

On the other hand, in a case where the number of times of the operation N has reached the predetermined number N1 (YES in Step S30), second operation information that is at least one piece of the operation information among the plurality of pieces of operation information corresponding to the wireless connection error, which correspond to the operation that has not been performed by the user, is displayed on the monitor 34 by the display control unit 33 (Step S31).

Subsequently, the user reads the second operation information displayed on the monitor 34, and performs an operation corresponding to the second operation information (Step S32).

As described above, in the ultrasound system, in a case where the occurrence of the error is detected, the display control unit 33 displays the first operation information among the plurality of pieces of operation information corresponding to the wireless connection error, on the monitor 34.

In the following order, the user operation information of the operation corresponding to the first operation information, which is performed by the user who reads the first operation information, is acquired by the operation information acquisition unit 63, whether or not the elapse time from the detection of the occurrence of the error has passed the predetermined period is determined by the elapse time determination unit 64, and in a case where it is determined that the elapse time has not passed the predetermined period, whether or not the number of times of the operation corresponding to the first operation information, which is performed by the user within the predetermined period, has reached the predetermined number is determined by the number-of-times-of-operation determination unit 66 on the basis of the user operation information.

Then, in a case where the number of times of the operation has reached the predetermined number within the predetermined period after the first operation information is displayed, the display control unit 33 proposes the second operation information to the user.

In this manner, in the ultrasound system, in order to resolve the wireless connection error, in a case where the number of times of the operation corresponding to the first operation information, which is performed by the user, has reached the predetermined number within the predetermined period, the second operation information corresponding to an operation that has not been performed by the user is proposed to the user, and therefore, the user can perform the operation corresponding to the second operation information after performing the operation corresponding to the first operation information a predetermined number of times within a predetermined period. Therefore, with the ultrasound system, it is possible to support the user to resolve the wireless communication error without repeating the same operation.

Note that the number of pieces of the operation information displayed at once can be set according to the screen size of the monitor 34. For example, in a case where the screen size of the monitor 34 is small, one piece of the operation information is displayed at once, and in a case where the screen size is large, three pieces of the operation information are displayed at once.

Next, the operation of the ultrasound diagnosis application program will be described.

Figure 7:
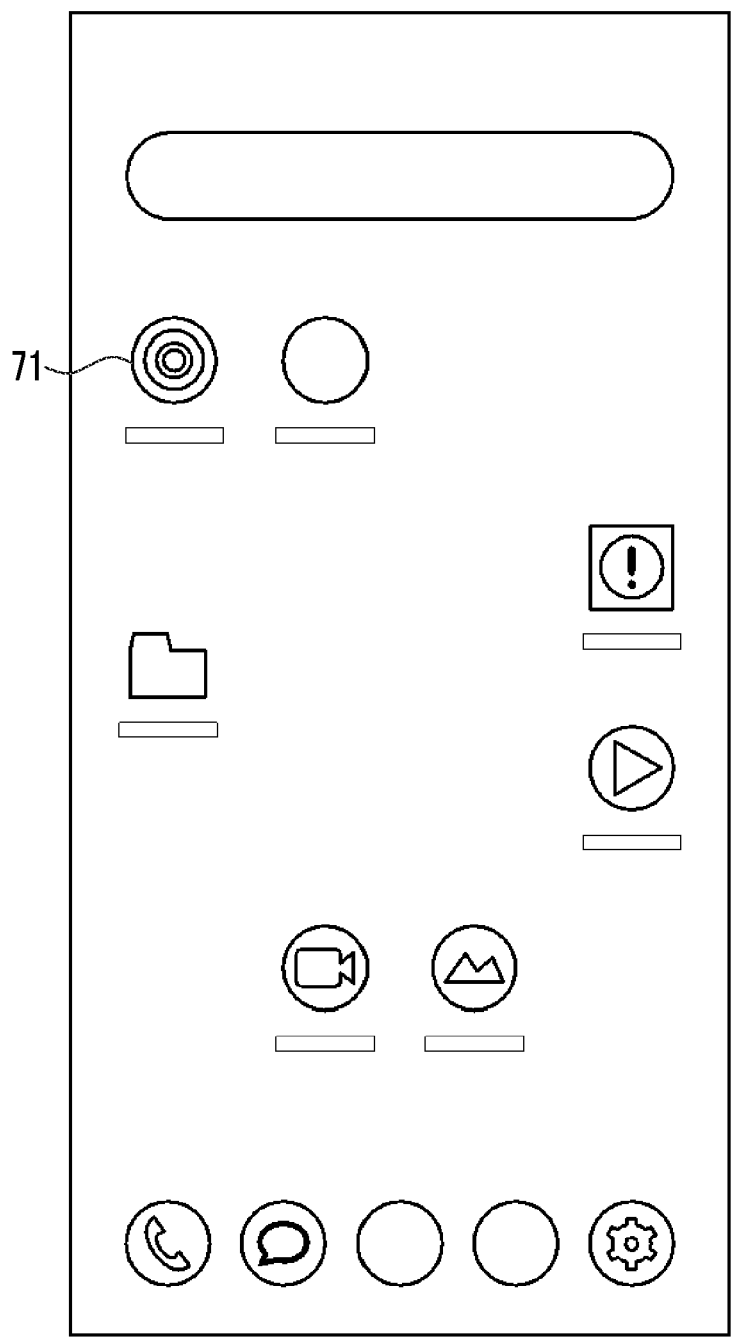
FIG. 7 is a conceptual diagram of a home screen of the information terminal.

As illustrated in FIG. 7, in addition to an icon 71 of the ultrasound diagnosis application program, icons of various application programs are displayed on the home screen of the information terminal 3.

Figure 8:
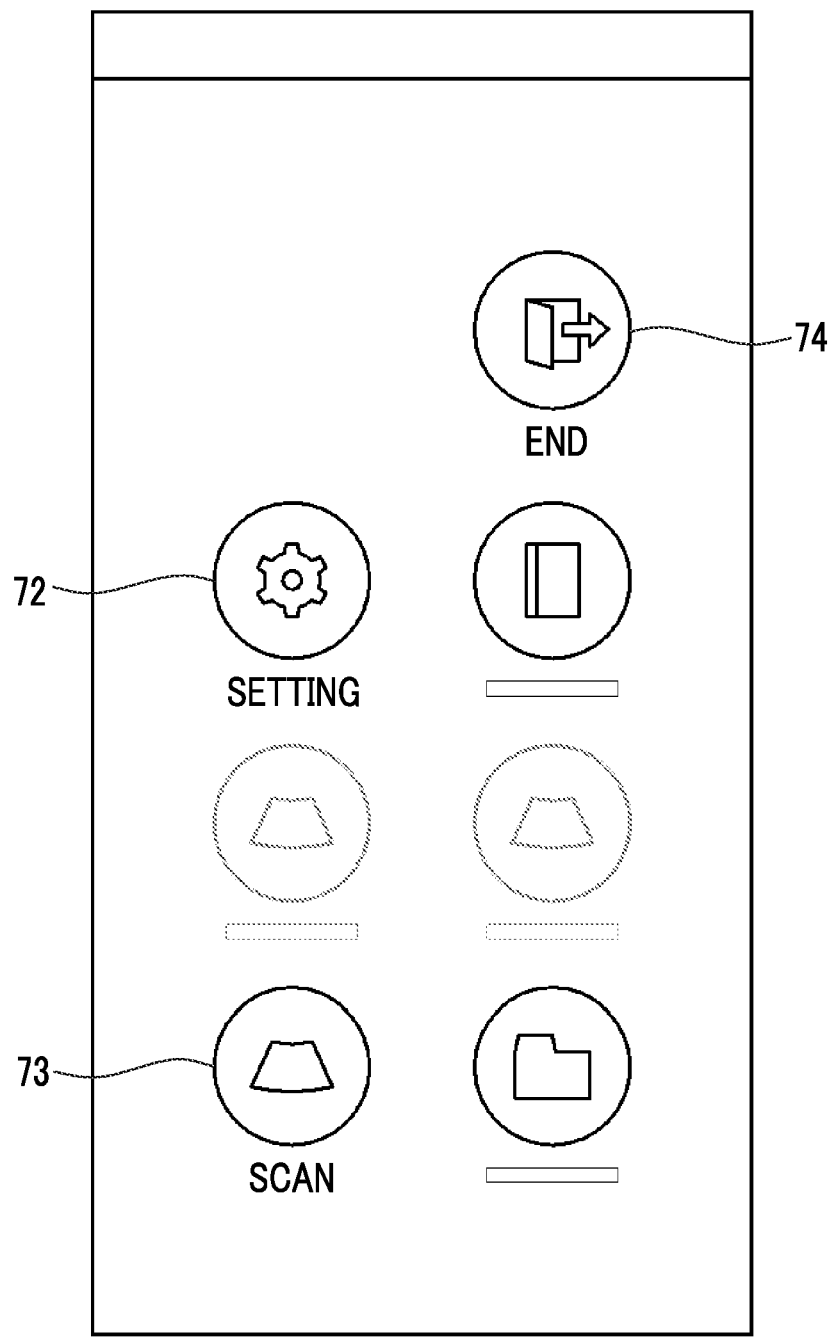
FIG. 8 is a conceptual diagram of a main menu screen of an ultrasound diagnosis application program.

In a case where the icon 71 of the ultrasound diagnosis application program is tapped by the user, the main menu screen is displayed as illustrated in FIG. 8. On the main menu screen, various buttons such as a setting button 72 for performing various settings for the ultrasound diagnosis application program, a scan button 73 for scanning the subject using ultrasound beams, and an end button 74 for ending the ultrasound diagnosis application program are displayed.

Figure 9:
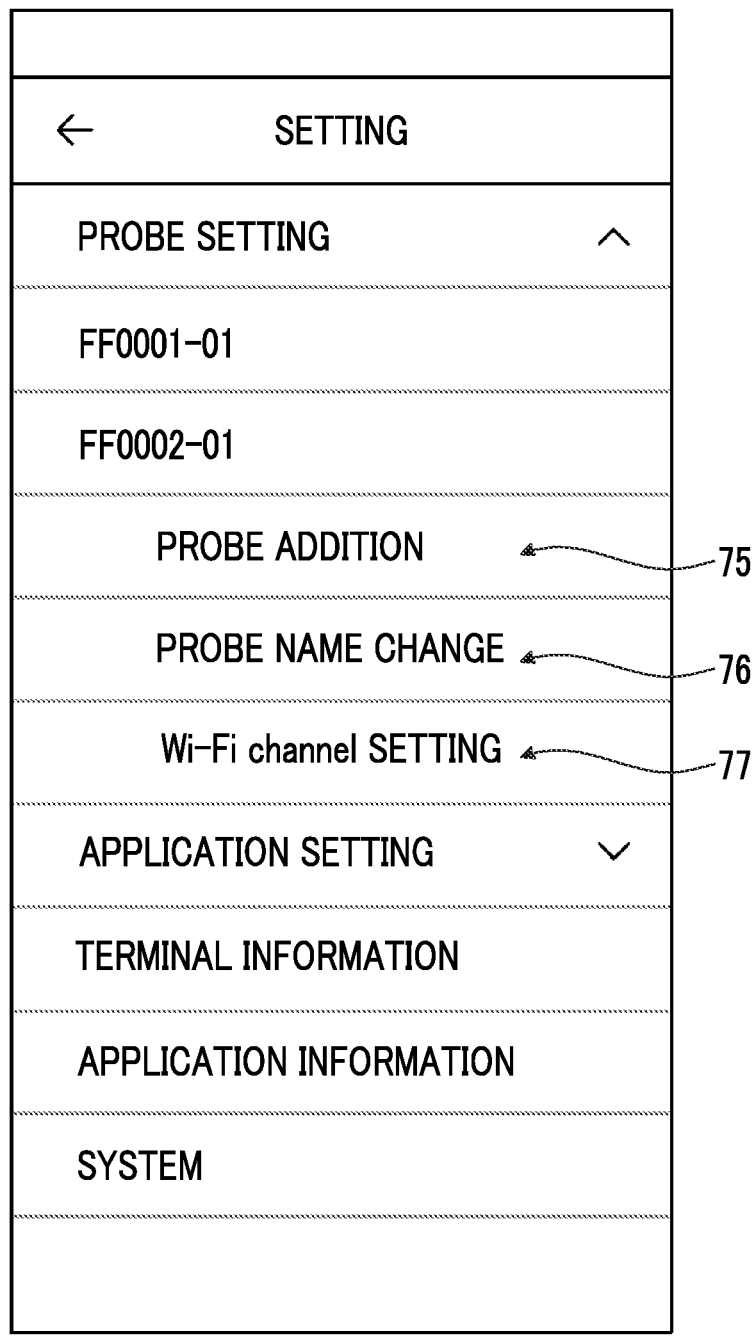
FIG. 9 is a conceptual diagram of a setting screen of the ultrasound diagnosis application program.

In a case where the setting button 72 is tapped on the main menu screen, the setting screen illustrated in FIG. 9 is displayed. On the setting screen, items such as probe setting, application setting, terminal information, application information, and system are displayed.

In the item of the probe setting, a list of names of the registered ultrasound probes, a probe addition button 75 for adding a new ultrasound probe, a probe name change button 76 for changing the name of the ultrasound probe, a Wi-Fi channel setting button 77 for performing the setting of Wi-Fi, and the like are displayed. In the case of the illustrated example, FF0001-01 and FF0002-01 are the names of the registered ultrasound probes.

That is, the user can check the name of the registered ultrasound probe on the setting screen.

Figure 10:
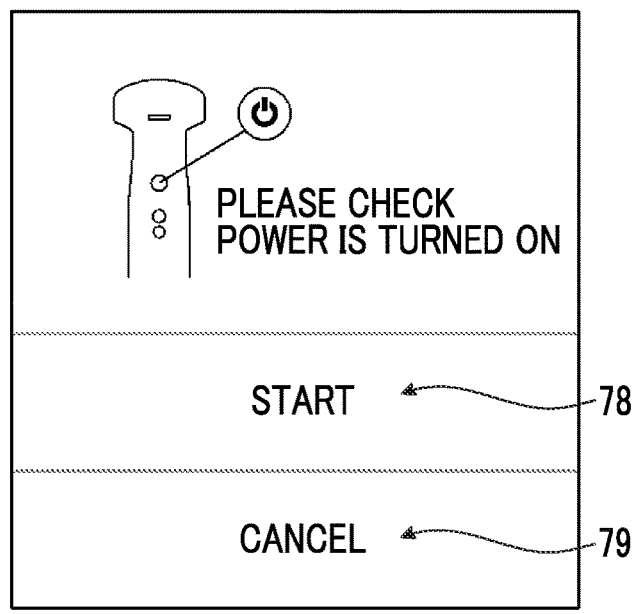
FIG. 10 is a conceptual diagram of a detection start screen of the ultrasound probe.

In a case where the probe addition button 75 is tapped on the setting screen, a detection start screen for selecting to start or cancel the detection of the ultrasound probe that can be wirelessly connected to the information terminal 3 is displayed as illustrated in FIG. 10.

In a case where a start button 78 is tapped on the detection start screen of the ultrasound probe, the ultrasound probe that can be wirelessly connected to the information terminal 3 is automatically detected. As a result, in a case where a new ultrasound probe is detected, the name of the detected new ultrasound probe is added to the list of the names of the registered ultrasound probes.

In this manner, the user can add a new ultrasound probe.

On the other hand, in a case where a new ultrasound probe is not detected, as the information of the type of the error, a message representing that a new ultrasound probe is not detected and the operation information for resolving the error are displayed as illustrated in FIG. 6 described above.

In this manner, the user can understand that a new ultrasound probe is not detected by reading the information of the type of the error, and can perform the operation for resolving the error by reading the operation information.

In a case where a cancel button (CANCEL) 79 is tapped on the detection start screen of the ultrasound probe, addition of a new ultrasound probe is stopped, and the screen returns to the setting screen.

Figure 11:
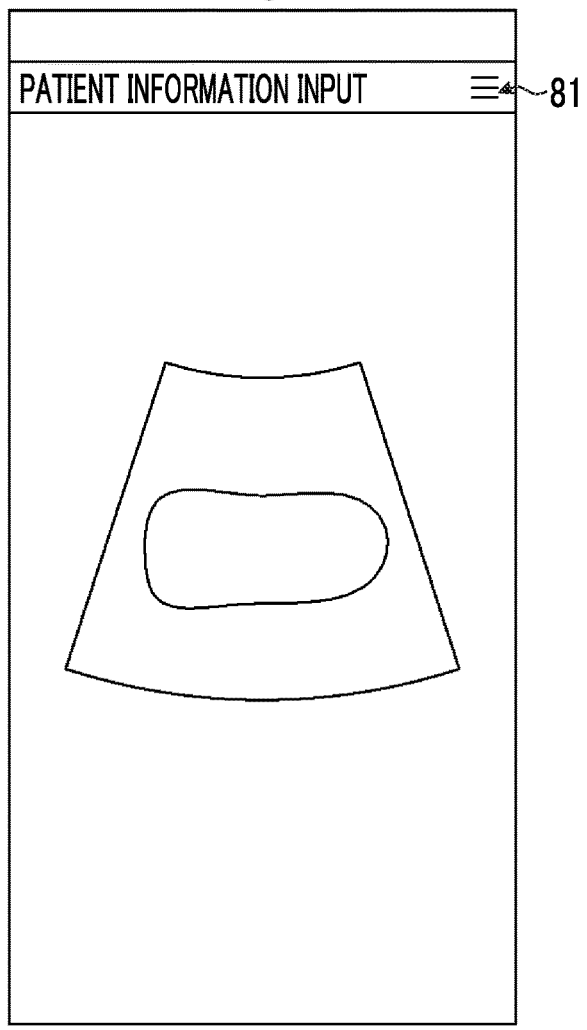
FIG. 11 is a conceptual diagram of a scan screen.

In a case where the scan button 73 is tapped on the main menu screen, the scan screen illustrated in FIG. 11 is displayed.

On the scan screen, in a case where the patient information is input and scanning is started, scanning is performed on the subject (patient) using ultrasound beams, and image information data of the scanned subject is wirelessly transmitted from the ultrasound probe 1 to the information terminal 3. Then, in the information terminal 3, the ultrasound image corresponding to the image information data received from the ultrasound probe 1 is displayed on the scan screen.

Figure 12:
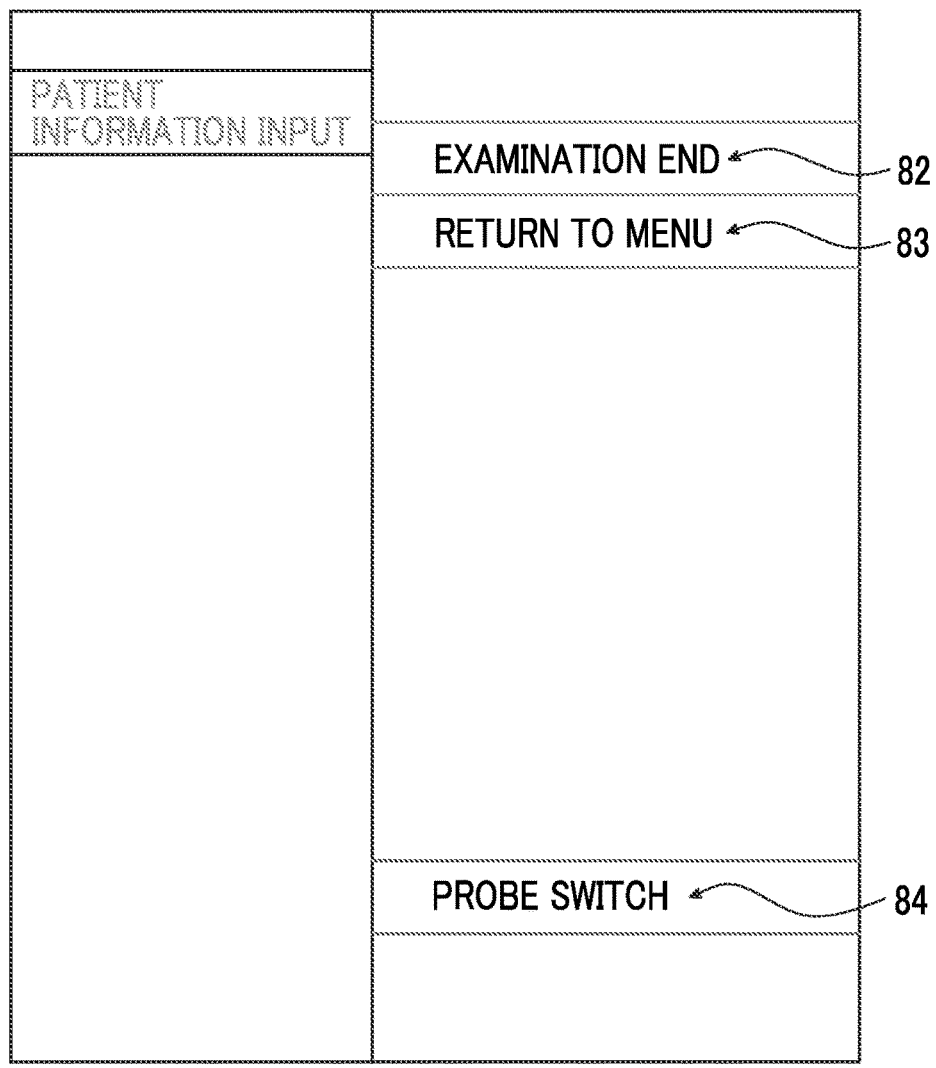
FIG. 12 is a conceptual diagram of a scan menu screen.

A scan menu button 81 is displayed on the upper right side of the scan screen. In a case where the scan menu button 81 is tapped, a scan menu screen is displayed as illustrated in FIG. 12. On the scan menu screen, an examination end button 82 for ending the examination, a menu return button 83 for returning to the menu screen, and a probe switch button 84 for switching the ultrasound probe to be used are displayed.

Figure 13:
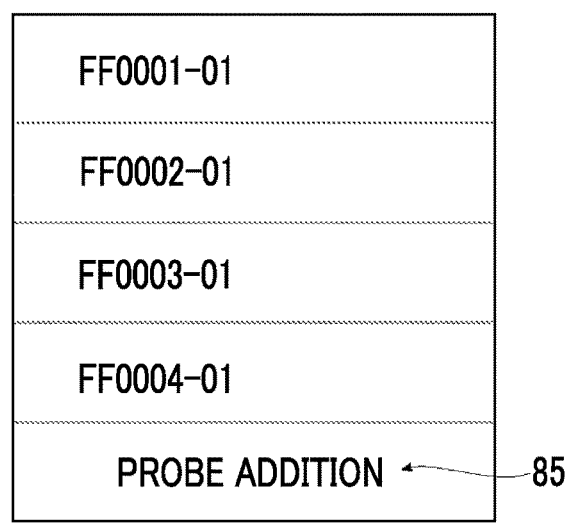
FIG. 13 is a conceptual diagram of a display screen of a list of names of registered ultrasound probes.

In a case where the probe switch button 84 is tapped on the scan menu screen, the display screen of the list of the names of the ultrasound probes that can be wirelessly connected to the information terminal 3 is displayed as illustrated in FIG. 13. In a case where the name of any one ultrasound probe is tapped on the display screen of the list, the connection between the ultrasound probe being used and the information terminal 3 is disconnected, and then, the tapped ultrasound probe and the information terminal 3 are wirelessly connected.

That is, the user can switch the ultrasound probe being used to the tapped ultrasound probe by tapping the name of any ultrasound probe displayed in the list.

On the display screen of the list, in addition to the list of the names of the ultrasound probes that can be wirelessly connected to the information terminal 3, a probe addition button 85 is displayed. The function of the probe addition button 85 on the display screen of the list is the same as that of the probe addition button 75 on the setting screen. That is, the detection start screen of the ultrasound probe illustrated in FIG. 10 can be displayed by tapping the probe addition button 75 on the setting screen or tapping the probe addition button 85 on the display screen of the list.

In a case where the examination end button 82 is tapped on the scan menu screen, the examination (scan) is ended, various items (patient information, saved image, and the like) set for examining the patient are grouped into one examination and moved to the examination history, the various items are initialized, and then the screen returns to the scan screen illustrated in FIG. 11. On the other hand, in a case where the menu return button 83 is tapped, the various items are initialized, and the screen returns to the main menu screen illustrated in FIG. 8.

As described above, the user can perform operations of checking the names of the registered ultrasound probes, scanning the subject, adding a new ultrasound probe, switching the ultrasound probe to be used, and the like.

Next, specific examples of the operation performed by the user for resolving the error will be described.

First Example

In a case where the scan button is tapped by the user, as long as there is no problem, the ultrasound probe 1 in the user's hand and the information terminal 3 are wirelessly connected, the subject is scanned using the ultrasound beams in the ultrasound probe 1, the image information data is transmitted from the ultrasound probe 1, and the ultrasound image corresponding to the image information data received from the ultrasound probe 1 is displayed in the information terminal 3.

However, even in a case where the scan button is tapped by the user, the ultrasound image is not displayed on the display screen of the information terminal 3.

Therefore, it is assumed that, in order to resolve the problem, the user performed (1) an operation of tapping the scan button again, (2) an operation of tapping the probe switch button to select the ultrasound probe 1 to be used again, and (3) an operation of tapping the probe addition button to add the ultrasound probe 1 to be used in a short time, but the ultrasound image is not displayed.

In this case, for example, in a case where the operations of (1) to (3) are performed three times in total within two minutes after the operation of (1) is performed, the error processing unit 35 displays the operation information of "please try wired connection between the ultrasound probe and the information terminal" as a message.

The three times of the operations in total include not only a case in which each of the operation of (1), the operation of (2), and the operation of (3) is performed once, but also, for example, a case in which only the operation of (1) is repeatedly performed three times, and a case in which the operation of (1) and the operation of (2) are performed three times in total. That is, the number of times of the operation may be a total number of times a single operation is performed or a total number of times two or more operations are performed.

In this manner, in a case where the number of times of the operation corresponding to the first operation information as at least one piece of the operation information, which is performed by the user, has reached the predetermined number within the predetermined period, the error processing unit 35 can propose an operation of connecting the ultrasound probe 1 and the information terminal 3 using a wired cable, as the second operation information that is at least one piece of operation information corresponding to an operation that has not been performed by the user, among the plurality of pieces of operation information.

Even in a case where a wireless connection error has occurred, the ultrasound image can be displayed by connecting the ultrasound probe 1 to be used and the information terminal 3 using a wired cable, regardless of the wireless connection error.

Second Example

Similarly, even in a case where the scan button is tapped by the user, the ultrasound image is not displayed, and thus the information on the type of the error and the operation information are displayed as illustrated on the left side of FIG. 14.

Therefore, it is assumed that, in order to try to connect the ultrasound probe 1 to be used in a wireless manner again, the user repeatedly performs (4) an operation of displaying the list of the registered ultrasound probes as illustrated on the right side of FIG. 14, and (5) an operation of tapping the probe addition button to add the ultrasound probe 1 to be used without scrolling the names of the ultrasound probes displayed in the list as the operation of connecting the ultrasound probe 1 in a wireless manner again, in a short time, but the ultrasound image is not displayed.

In this case, for example, in a case where the operations of (4) and (5) are performed three times in total within two minutes after the operation of (4) is performed, the error processing unit 35 reads the operation information of "please scroll to display and select an undisplayed ultrasound probe" by sound.

In this manner, in a case where the list including only the names of a predetermined number of ultrasound probes among a group of the ultrasound probes that can be wirelessly connected to the information terminal 3 is displayed and the number of times of the operation has reached the predetermined number within the predetermined period, the error processing unit 35 can propose an operation of selecting an undisplayed ultrasound probe that is not displayed in the list among the group of the ultrasound probes, as the second operation information.

Even in a case where the user does not know that the names of the ultrasound probes displayed in the list can be scrolled, since it is possible to cause the user to display the names of the unused ultrasound probe by scrolling by proposing an operation of selecting the undisplayed ultrasound probe, it is possible to try the undisplayed ultrasound probe without repeatedly performing the operation of adding the ultrasound probe to be used.

Third Example

In a case where the number of times of the operation has reached the predetermined number within the predetermined period, the error processing unit 35 may propose an operation of selecting a wizard-based ultrasound probe from the group of the ultrasound probes than can be wirelessly connected to the information terminal 3 instead of reading the operation information as the second operation information by sound in the second example.

In this case, for example, in a case where the operations of (4) and (5) are performed three times in total within two minutes after the operation of (4) is performed, the error processing unit 35 displays the operation information of "which one of a convex or linear ultrasound probe is better?" as a message. It is assumed that the user selects a linear ultrasound probe. In response, the error processing unit 35 displays the list including only the names of linear ultrasound probes. Then, the user selects the name of the ultrasound probe to be used from the names of the linear ultrasound probes displayed in the list.

In this manner, using the wizard method, an operation of displaying questions and selection items to urge the user to perform selection and input is repeatedly performed to interactively proceed the processing, and thus the user can efficiently select the ultrasound probe to be used without scrolling the names of the ultrasound probes displayed in the list and displaying the undisplayed ultrasound probes that are not displayed in the list.

Fourth Example

Similarly, even in a case where the scan button is tapped by the user, the ultrasound image is not displayed.

Therefore, it is assumed that, in order to try to connect the ultrasound probe 1 to be used in a wireless manner again, the user repeatedly performs (6) an operation of displaying the list of the registered ultrasound probes as illustrated in FIG. 13, (7) an operation of tapping and selecting the ultrasound probe from the list of the ultrasound probes displayed in the list without scrolling the names of the ultrasound probes displayed in the list, and (8) an operation of tapping the probe addition button to add the ultrasound probe 1, in a short time, but the ultrasound image is not displayed.

In this case, for example, in a case where the operations of (6) to (8) are performed three times in total within two minutes after the operation of (6) is performed, the error processing unit 35 displays an advice of "please select an untried ultrasound probe".

In this manner, in a case where the number of times of the operation has reached the predetermined number within the predetermined period, the error processing unit 35 can propose, as the second operation information, an operation of selecting an untried ultrasound probe for which the wireless connection with the information terminal 3 is not tried after the operation corresponding to the first operation information is performed by the user, from the group of the ultrasound probes that can be wirelessly connected to the information terminal 3.

Even in a case where the user does not know that the names of the ultrasound probes displayed in the list can be scrolled, since the user can understand that there are untried ultrasound probes and untried ultrasound probes can be found by proposing an operation of selecting the untried ultrasound probe, it is possible to try the untried ultrasound probe without repeatedly performing the operation of selecting the ultrasound probe 1 and the operation of adding the ultrasound probe 1.

Further, in a case of proposing an operation of selecting the untried ultrasound probe, for example, the error processing unit 35 may arrange the names of the untried ultrasound probes from the top of a list including only the names of a predetermined number of ultrasound probes, and display the list. In this case, the names of the untried ultrasound probes may be highlighted. Alternatively, only the names of the untried ultrasound probes may be included in the list including only the names of a predetermined number of ultrasound probes, and the list may be displayed.

Thereby, it becomes easy for the user to identify the untried ultrasound probes.

The error processing unit 35 may display the second operation information as a text message or a video using the display control unit 33, or may read the second operation information by sound using the sound output unit 67. By reading the second operation information by sound, the content of the second operation information can be proposed to the user regardless of the size of the display screen of the information terminal 3.

The image processing unit 17 may be provided to the information terminal 3 instead of being provided to the ultrasound probe 1. In this case, image signal data before imaging into the ultrasound image is generated by the signal processing unit 16, the image signal data generated by the signal processing unit 16 is wirelessly transmitted from the probe-side communication circuit 18 of the ultrasound probe 1 to the terminal-side communication circuit 32 of the information terminal 3, and the ultrasound image is generated on the basis of the image signal data by the image processing unit of the information terminal 3.

In this case, in the information terminal 3, since the ultrasound image is generated by performing the image processing on the image signal data, there is an advantage that image processing conditions such as gain can be freely changed according to the display characteristics of the monitor 34 after the ultrasound image is displayed on the monitor 34.

In the device of the present invention, the hardware configurations of the processing units executing various kinds of processing such as the transmission and reception circuit 14, the signal processing unit 16, the image processing unit 17, the probe control unit 21, the display control unit 33, the error detection unit 62, the operation information acquisition unit 63, the elapse time determination unit 64, the number-of-times-of-operation determination unit 66, the terminal control unit 36, and the like may be dedicated hardware, or may be various processors or computers that execute programs. The hardware configuration of the cine-memory 22, the operation information storage unit 61, and the like may be dedicated hardware, or may be a memory such as a semiconductor memory and a storage device such as a hard disk drive (HDD) and a solid state drive (SSD).

The various processors include a central processing unit (CPU) as a general-purpose processor executing software (program) and functioning as various processing units, a programmable logic device (PLD) as a processor of which the circuit configuration can be changed after manufacturing such as a field programmable gate array (FPGA), and a dedicated electric circuit as a processor having a circuit configuration designed exclusively for executing a specific process such as an application specific integrated circuit (ASIC).

One processing unit may be configured by one of the various processors or may be configured by a combination of the same or different kinds of two or more processors, for example, a combination of a plurality of FPGAs or a combination of an FPGA and a CPU). Further, a plurality of processing units may be configured by one of various processors, or two or more of a plurality of processing units may be collectively configured by using one processor.

For example, there is a form where one processor is configured by a combination of one or more CPUs and software as typified by a computer, such as a server and a client, and this processor functions as a plurality of processing units. Further, there is a form where a processor fulfilling the functions of the entire system including a plurality of processing units by one integrated circuit (IC) chip as typified by a system on chip (SoC) or the like is used.

Furthermore, the hardware configurations of these various processors are more specifically electric circuitry where circuit elements, such as semiconductor elements, are combined.

The method of the present invention can be carried out, for example, by a program for causing a computer to execute each step of the method. Further, a computer-readable recording medium in which this program is recorded can also be provided.

The present invention has been described in detail, but the present invention is not limited to the above-described embodiments, and various improvements and changes may be made within a range not departing from the scope of the present invention.

EXPLANATION OF REFERENCES

1: ultrasound probe
3: information terminal
7: communication line
11: transducer array
14: transmission and reception circuit
16: signal processing unit
17: image processing unit
18: probe-side communication circuit
19: image information data generation unit
21: probe control unit
22: cine-memory
24: battery
25: probe-side processor
32: terminal-side communication circuit
33: display control unit
34: monitor
35: error processing unit
36: terminal control unit
37: input device
39: terminal-side processor
51: pulser
52: amplification unit
53: AD conversion unit
54: beam former
61: operation information storage unit
62: error detection unit
63: operation information acquisition unit
64: elapse time determination unit
66: number-of-times-of-operation determination unit
67: sound output unit
71: icon of ultrasound diagnosis application program
72: setting button
73: scan button
74: end button
75: probe addition button
76: probe name change button
77: Wi-Fi channel setting button
78: start button
79: cancel button
81: scan menu button
82: examination end button
83: menu return button
84: probe switch button
85: probe addition button

What is claimed is:

1. An ultrasound system comprising:
an ultrasound probe; and
a handheld information terminal connected to the ultrasound probe in a wired or wireless manner,
wherein the information terminal includes
an operation information storage unit that stores an operation of connecting the ultrasound probe and the information terminal using a wired cable, and names of one or more ultrasound probes that can be wirelessly connected to the information terminal, as a plurality of pieces of operation information corresponding to an operation of connecting the ultrasound probe and the information terminal which is performed by a user for resolving a wireless connection error between the ultrasound probe and the information terminal, the wireless connection error causing a failure to display on the information terminal an ultrasound image of a subject scanned with the ultrasound probe, and
an error processing unit that, in a case where a number of times of the operation corresponding to first operation information being at least one piece of the operation information among the plurality of pieces of operation information, which is performed by the user, has reached a predetermined number within a predetermined period, proposes the operation of connecting using the wired cable or one of the names of one or more ultrasound probes that are stored in the operation information storage unit, as second operation information being at least one piece of the operation information among the plurality of pieces of operation information, which corresponds to an operation that is not performed by the user, to the user.

2. The ultrasound system according to claim 1,
wherein, in a case where the ultrasound image of the subject is not displayed on the information terminal even by performing an operation of starting scanning the subject, and in a case where a total number of performed operations including an operation of starting scanning the subject, an operation of changing the ultrasound probe that can be wirelessly connected to the information terminal, and an operation of adding an ultrasound probe that can be wirelessly connected to the information terminal has reached the predetermined number within the predetermined period,
the error processing unit proposes the second operation information.

3. The ultrasound system according to claim 2,
wherein the error processing unit displays the second operation information as a message including text or a video.

4. The ultrasound system according to claim 2,
wherein the error processing unit outputs the second operation information by sound.

5. The ultrasound system according to claim 1,
wherein, in a case where a list including only names of a predetermined number of ultrasound probes among a group of the ultrasound probes that can be wirelessly connected to the information terminal is displayed and the number of times of the operation has reached the predetermined number within the predetermined period, the error processing unit proposes an operation of selecting an undisplayed ultrasound probe that is not included in the list among the group of the ultrasound probes that can be wirelessly connected to the information terminal, as the second operation information.

6. The ultrasound system according to claim 5,
wherein, in a case where the number of times of the operation has reached the predetermined number within the predetermined period, the error processing unit proposes an operation of a wizard-based selection for selecting an ultrasound probe from the group of the ultrasound probes that can be wirelessly connected to the information terminal, as the second operation information.

7. The ultrasound system according to claim 6,
wherein the error processing unit displays the second operation information as a message including text or a video.

8. The ultrasound system according to claim 6,
wherein the error processing unit outputs the second operation information by sound.

9. The ultrasound system according to claim 5,
wherein the error processing unit displays the second operation information as a message including text or a video.

10. The ultrasound system according to claim 5,
wherein the error processing unit outputs the second operation information by sound.

11. The ultrasound system according to claim 1,
wherein, in a case where the number of times of the operation has reached the predetermined number within the predetermined period, after the operation corresponding to the first operation information is performed, the error processing unit proposes an operation of selecting an ultrasound probe that hasn't been tried by the user to wirelessly connect to the information terminal yet from a group of the ultrasound probes that can be wirelessly connected to the information terminal.

12. The ultrasound system according to claim 11,
wherein the error processing unit displays a list in which names of the untried ultrasound probes are arranged from a top and wherein the error processing unit display includes only names of a predetermined number of the ultrasound probes.

13. The ultrasound system according to claim 12,
wherein the error processing unit highlights a name of an untried ultrasound probe.

14. The ultrasound system according to claim 11,
wherein the error processing unit displays a list in which only names of the untried ultrasound probes are arranged and wherein the error processing unit display includes only names of a predetermined number of the ultrasound probes.

15. The ultrasound system according to claim 11,
wherein the error processing unit displays the second operation information as a message including text or a video.

16. The ultrasound system according to claim 11,
wherein the error processing unit outputs the second operation information by sound.

17. The ultrasound system according to claim 1,
wherein the error processing unit displays the second operation information as a message including text or a video.

18. The ultrasound system according to claim 1,
wherein the error processing unit outputs the second operation information by sound.

19. A control method of an ultrasound system including an ultrasound probe, and a handheld information terminal connected to the ultrasound probe in a wired or wireless manner, the control method comprising:
storing in advance an operation of connecting the ultrasound probe and the information terminal using a wired cable, and names of one or more ultrasound probes that can be wirelessly connected to the information terminal, as a plurality of pieces of operation information corresponding to operations of connecting the ultrasound probe and the information terminal which can be performed by a user for resolving a wireless connection error between the ultrasound probe and the information terminal in an operation information storage unit of the information terminal, the wireless connection error causing a failure to display on the information terminal an ultrasound image of a subject scanned with the ultrasound probe;
counting a number of times the user performs an operation and an elapse time during which the user performs the operation, the operation corresponding to a first operation information being at least one piece of the operation information among the plurality of pieces of operation information stored in the operation information storage, by utilizing a counter included in a number-of-times-of-operation determination unit and a timer included in an elapsed time determination unit, respectively, of an error processing unit of the information terminal, and
proposing, in a case where the elapsed time counted by the timer of the elapsed time determination unit is within a predetermined period and a number of times the user performed the operation counted by the counter of the number-of-times-of-operation determination unit has reached a predetermined number within the predetermined period, the operation of connecting using the wired cable or one of the names of one or more ultrasound probes that are stored in the operation information storage unit, as second operation information being at least one piece of the operation information among the plurality of pieces of operation information, which corresponds to an operation that is not performed by the user, to the user by the error processing unit of the information terminal.

20. The control method of an ultrasound system according to claim 19, wherein in the proposing, in a case where the ultrasound image of the subject is not displayed on the information terminal even by performing an operation of starting scanning the subject, and in a case where a total number of performed operations including an operation of starting scanning the subject, an operation of changing the ultrasound probe that can be wirelessly connected to the information terminal, and an operation of adding an ultrasound probe that can be wirelessly connected to the information terminal has reached the predetermined number within the predetermined period, the error processing unit proposes the second operation information.

* * * * *